US012675016B2

(12) United States Patent
Kim et al.

(10) Patent No.: US 12,675,016 B2
(45) Date of Patent: Jul. 7, 2026

(54) COMPLEX LIGHT MODULATOR, HOLOGRAPHIC DISPLAY DEVICE, AND SEE-THROUGH DISPLAY DEVICE

(71) Applicants: SAMSUNG ELECTRONICS CO., LTD., Suwon-si (KR); Korea University Research and Business Foundation, Sejong Campus, Sejong-si (KR)

(72) Inventors: Yunhee Kim, Seoul (KR); Hwi Kim, Sejong-si (KR); Sehwan Na, Sejong-si (KR); Hoon Song, Yongin-si (KR); Hongseok Lee, Seoul (KR)

(73) Assignees: SAMSUNG ELECTRONICS CO., LTD., Suwon-si (KR); Korea University Research and Business Foundation, Sejong Campus, Sejong-si (KR)

( * ) Notice: Subject to any disclaimer, the term of this patent is extended or adjusted under 35 U.S.C. 154(b) by 0 days.

(21) Appl. No.: 18/812,618

(22) Filed: Aug. 22, 2024

(65) Prior Publication Data

US 2024/0411181 A1 Dec. 12, 2024

Related U.S. Application Data

(62) Division of application No. 17/903,687, filed on Sep. 6, 2022, now Pat. No. 12,099,276.

(30) Foreign Application Priority Data

Feb. 4, 2022 (KR) ........................ 10-2022-0015078

(51) Int. Cl.
G02F 1/13363 (2006.01)
G02B 27/01 (2006.01)

G02F 1/1335 (2006.01)
G02F 1/1343 (2006.01)
G03H 1/22 (2006.01)
G02F 1/1337 (2006.01)
G02F 1/1368 (2006.01)
G02F 1/139 (2006.01)

(52) U.S. Cl.
CPC ... G02F 1/133633 (2021.01); G02B 27/0172 (2013.01); G02F 1/133514 (2013.01);
(Continued)

(58) Field of Classification Search
CPC ................................................ G02F 1/133633
See application file for complete search history.

(56) References Cited

U.S. PATENT DOCUMENTS 9,360,840 B2 6/2016 Won et al.
9,740,168 B2 8/2017 Sung et al.
(Continued)

FOREIGN PATENT DOCUMENTS

CN 113093440 A 7/2021
KR 10-2014-0098010 A 8/2014
(Continued)

OTHER PUBLICATIONS

Extended European Search Report issued by the European Patent Office on Feb. 1, 2023 in European Patent Application No. 22198847.0.

*Primary Examiner* — Edmond C Lau
(74) *Attorney, Agent, or Firm* — Sughrue Mion, PLLC

(57) ABSTRACT

A complex light modulator including a first polarization plate, a second polarization plate provided, an amplitude modulator provided between the first polarization plate and the second polarization plate, a phase modulator provided between the amplitude modulator and the second polarization plate, and color filters provided between the amplitude modulator and the phase modulator.

14 Claims, 18 Drawing Sheets

(52) U.S. Cl.
    CPC .. *G02F 1/133528* (2013.01); *G02F 1/133636*
            (2013.01); *G02F 1/133638* (2021.01); *G02F*
            *1/134345* (2021.01); *G03H 1/2294* (2013.01);
            *G02B 2027/0174* (2013.01); *G02B 2027/0178*
            (2013.01); *G02F 1/1337* (2013.01); *G02F*
            *1/1368* (2013.01); *G02F 1/1396* (2013.01);
            *G02F 2413/01* (2013.01); *G03H 2223/15*
            (2013.01); *G03H 2223/20* (2013.01); *G03H*
            *2223/22* (2013.01); *G03H 2225/22* (2013.01);
                                    *G03H 2225/34* (2013.01)

(56)                   References Cited

U.S. PATENT DOCUMENTS

| 2010/0195178 | A1 |   | 8/2010 | Leister et al. |
| 2013/0321888 | A1 | * | 12/2013 | Sung ........................ G03H 1/02 |
|  |  |  |  | 359/256 |
| 2016/0077339 | A1 |   | 3/2016 | Christmas et al. |
| 2016/0085114 | A1 |   | 3/2016 | Oka et al. |
| 2016/0379606 | A1 |   | 12/2016 | Kollin et al. |
| 2019/0348006 | A1 |   | 11/2019 | Arai et al. |
| 2022/0299937 | A1 |   | 9/2022 | Kim et al. |
| 2023/0229111 | A1 | * | 7/2023 | Liu ...................... G03H 1/2294 |
|  |  |  |  | 348/40 |

FOREIGN PATENT DOCUMENTS

| KR |   | 10-1910980 | B1 | 10/2018 |
| KR |   | 10-2163735 | B1 | 10/2020 |
| KR | 10-2021-0085429 |   | A | 7/2021 |
| KR | 10-2021-0085430 |   | A | 7/2021 |
| KR | 10-2022-0131037 |   | A | 9/2022 |

* cited by examiner

FIG. 2

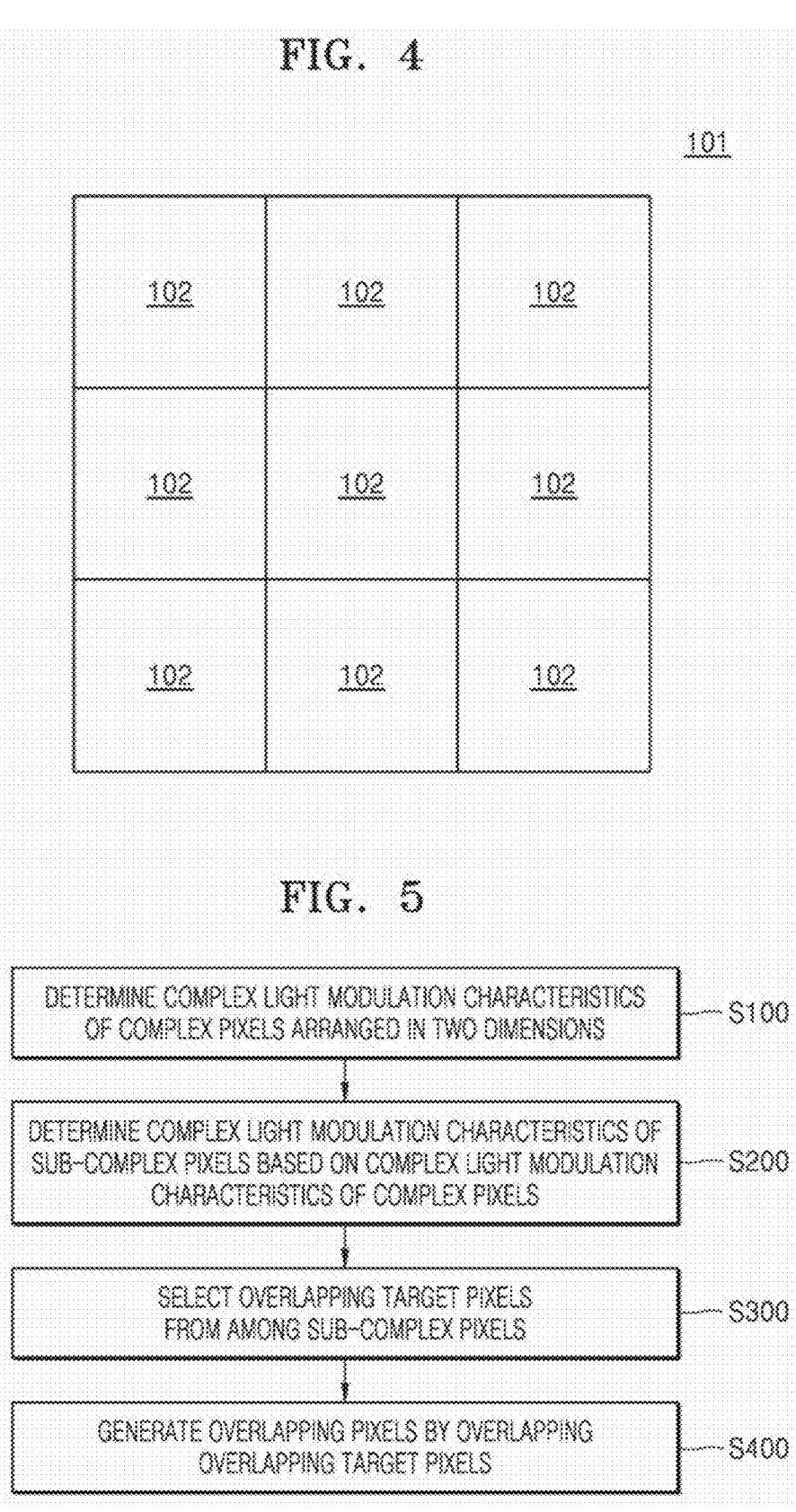

| 102 | 102 | 102 |
| 102 | 102 | 102 |
| 102 | 102 | 102 |

FIG. 5

DETERMINE COMPLEX LIGHT MODULATION CHARACTERISTICS
OF COMPLEX PIXELS ARRANGED IN TWO DIMENSIONS ——— S100

DETERMINE COMPLEX LIGHT MODULATION CHARACTERISTICS OF
SUB-COMPLEX PIXELS BASED ON COMPLEX LIGHT MODULATION
CHARACTERISTICS OF COMPLEX PIXELS ——— S200

SELECT OVERLAPPING TARGET PIXELS
FROM AMONG SUB-COMPLEX PIXELS ——— S300

GENERATE OVERLAPPING PIXELS BY OVERLAPPING
OVERLAPPING TARGET PIXELS ——— S400

COMPLEX LIGHT MODULATOR, HOLOGRAPHIC DISPLAY DEVICE, AND SEE-THROUGH DISPLAY DEVICE

CROSS-REFERENCE TO RELATED APPLICATION

This present application is a divisional of U.S. application Ser. No. 17/903,687, filed Sep. 6, 2022, which claims priority to Korean Patent Application No. 10-2022-0015078, filed on Feb. 4, 2022, in the Korean Intellectual Property Office, the disclosures of which are incorporated by reference herein in their entirety.

BACKGROUND

1. Field

Example embodiments of the present disclosure relate to a complex light modulator, a holographic display device, and a see-through display device.

2. Description of Related Art

A glasses method and a non-glasses method have been widely and commercially used as methods for implementing three-dimensional images. The glasses method includes a polarization glasses method and a shutter glasses method, and the non-glasses method includes a lenticular method and a parallax barrier method. These methods use binocular parallax of both eyes, but there is not only a limitation in increasing the number of points of view, but also a mismatch between a sense of depth perceived by the brain and the focus of the eyes, which makes viewers feel tired.

A holographic display method is considered to be a three-dimensional image display method that can provide full parallax and a match between the sense of depth perceived by the brain and the focus of the eyes. The holographic display method uses the principle of regeneration of an image of the original object by preparing a hologram pattern that records an interference pattern obtained by interfering object light reflected from the original object with reference light and emitting the reference light onto the hologram pattern to obtain diffracted light. Rather than obtaining a hologram pattern by directly exposing the original object, related holographic display method provides a computer generated hologram (CGH) signal as an electrical signal to a spatial light modulator. As the spatial light modulator forms a hologram pattern and diffracts reference light according to an input CGH signal, a three-dimensional image may be generated.

SUMMARY

One or more example embodiments provide a complex light modulator including an amplitude modulator and a phase modulator with an improved alignment state, and a holographic display device and a see-through display device, each including the complex light modulator.

One or more example embodiments also provide a complex light modulator that is less affected by diffraction, and a holographic display device and a see-through display device, each including the complex light modulator.

One or more example embodiments also provide a complex light modulator having a high resolution and low noise, and a holographic display device and a see-through display device, each including the complex light modulator.

However, the objectives to be solved are not limited to the above disclosure.

Additional aspects will be set forth in part in the description which follows and, in part, will be apparent from the description, or may be learned by practice of example embodiments.

According to an aspect of an example embodiment, there is provided a complex light modulator including a first polarization plate, a second polarization plate, an amplitude modulator provided between the first polarization plate and the second polarization plate, a phase modulator provided between the amplitude modulator and the second polarization plate, and color filters provided between the amplitude modulator and the phase modulator.

The phase modulator may contact the color filters.

The phase modulator may include a first cured liquid crystal layer, a second cured liquid crystal layer, a third cured liquid crystal layer, and a fourth cured liquid crystal layer, which are sequentially arranged in a direction from the first polarization plate toward the second polarization plate.

A first twist angle of the first cured liquid crystal layer and a fourth twist angle of the fourth cured liquid crystal layer may have a same magnitude and have opposite directions, and a second twist angle of the second cured liquid crystal layer and a third twist angle of the third cured liquid crystal layer may have a same magnitude and have opposite directions.

A first thickness of the first cured liquid crystal layer and a fourth thickness of the fourth cured liquid crystal layer may be equal to each other, and a second thickness of the second cured liquid crystal layer and a third thickness of the third cured liquid crystal layer may be equal to each other.

The complex light modulator may further include a light alignment layer provided between the color filters and the first cured liquid crystal layer.

The phase modulator may include phase modulation patterns respectively corresponding to the color filters.

The amplitude modulator may include a thin-film transistor (TFT) layer including TFTs, sub-pixel electrodes electrically connected to the TFTs, respectively, a common electrode layer provided on the sub-pixel electrodes, and a liquid crystal layer provided between the common electrode layer and the sub-pixel electrodes, and wherein the sub-pixel electrodes respectively correspond to the color filters.

The liquid crystal layer may include twisted nematic liquid crystals.

The first polarization plate and the second polarization plate may transmit light of a circular polarization in a same direction.

The phase modulator and the amplitude modulator may be configured to generate a first complex pixel having first complex light modulation characteristics and a second complex pixel having second complex light modulation characteristics, the first complex pixel may include first sub-complex pixels provided in a 3×3 matrix and configured to implement the first complex light modulation characteristics, the second complex pixel may include second sub-complex pixels provided in a 3×3 matrix and configured to implement the second complex light modulation characteristics, and the first complex pixel and the second complex pixel may share a first overlapping pixel included in the first sub-complex pixels and the second sub-complex pixels.

The phase modulator and the amplitude modulator may be further configured to generate a third complex pixel having third complex light modulation characteristics, the first overlapping pixel may include first overlapping pixels, the third complex pixel may include third sub-complex pixels provided in a 3×3 matrix and configured to implement the third complex light modulation characteristics, the first complex pixel, the second complex pixel, and the third complex pixel may share one of the first overlapping pixels, and the one of the first overlapping pixels may be included in the third sub-complex pixels.

The phase modulator and the amplitude modulator may be further configured to generate a fourth complex pixel having fourth complex light modulation characteristics, the fourth complex pixel may include fourth sub-complex pixels provided in a 3×3 matrix and configured to implement the fourth complex light modulation characteristics, the first complex pixel, the second complex pixel, the third complex pixel, and the fourth complex pixel may share the one of the first overlapping pixels, and the one of the first overlapping pixels may be included in the fourth sub-complex pixels.

The first complex pixel and the fourth complex pixel may further share a second overlapping pixel included in the first sub-complex pixels and the fourth sub-complex pixels.

Phases of the first sub-complex pixels may have a point symmetry, and phases of the second sub-complex pixels may have a point symmetry.

According to another aspect of an example embodiment, there is provided a holographic display device including a backlight unit configured to provide light having coherence, a Fourier lens configured to focus the light, and a complex light modulation element provided on a path of the light, wherein the complex light modulation element includes a first polarization plate, a second polarization plate, an amplitude modulator provided between the first polarization plate and the second polarization plate, a phase modulator provided between the amplitude modulator and the second polarization plate, and color filters provided between the amplitude modulator and the phase modulator.

The phase modulator may be in contact with the color filters.

The phase modulator may include a first cured liquid crystal layer, a second cured liquid crystal layer, a third cured liquid crystal layer, and a fourth cured liquid crystal layer, which are sequentially provided in a direction from the first polarization plate toward the second polarization plate, a first twist angle of the first cured liquid crystal layer and a fourth twist angle of the fourth cured liquid crystal layer may have a same magnitude and have opposite directions, and a second twist angle of the second cured liquid crystal layer and a third twist angle of the third cured liquid crystal layer may have a same magnitude and have opposite directions.

According to yet another aspect of an example embodiment, there is provided a see-through display device including a holographic display device configured to generate a holographic image, a combiner configured to combine the holographic image with an actual image and provide a combined image to a user, and a projection optical system configured to project the holographic image provided by the holographic display device to the combiner, wherein the holographic display device includes a backlight unit configured to provide light having coherence, a Fourier lens configured to focus the light, and a complex light modulation element provided on a path of the light, and wherein the complex light modulation element includes a first polarization plate, a second polarization plate, an amplitude modulator provided between the first polarization plate and the second polarization plate, a phase modulator provided between the amplitude modulator and the second polarization plate, and color filters provided between the amplitude modulator and the phase modulator.

A distance between the complex light modulation element and the projection optical system may be greater than 0 and less than or equal to 18 mm.

According to yet another aspect of an example embodiment, there is provided a complex light modulator including a first polarization plate, a second polarization plate, an amplitude modulator provided between the first polarization plate and the second polarization plate, a phase modulator provided between the amplitude modulator and the second polarization plate, the phase modulator including phase modulation patterns configured to delay a phase of incident light, and color filters provided between the amplitude modulator and the phase modulator.

BRIEF DESCRIPTION OF THE DRAWINGS

These and/or other aspects will become apparent and more readily appreciated from the following description of example embodiments, taken in conjunction with the accompanying drawings in which:

FIG. 2 is a conceptual view illustrating complex pixels;

FIG. 4 is a conceptual view illustrating sub-complex pixels;

FIG. 5 is a flowchart of a method of generating a covalent bond-type complex pixel group;

DETAILED DESCRIPTION

Figure 1:
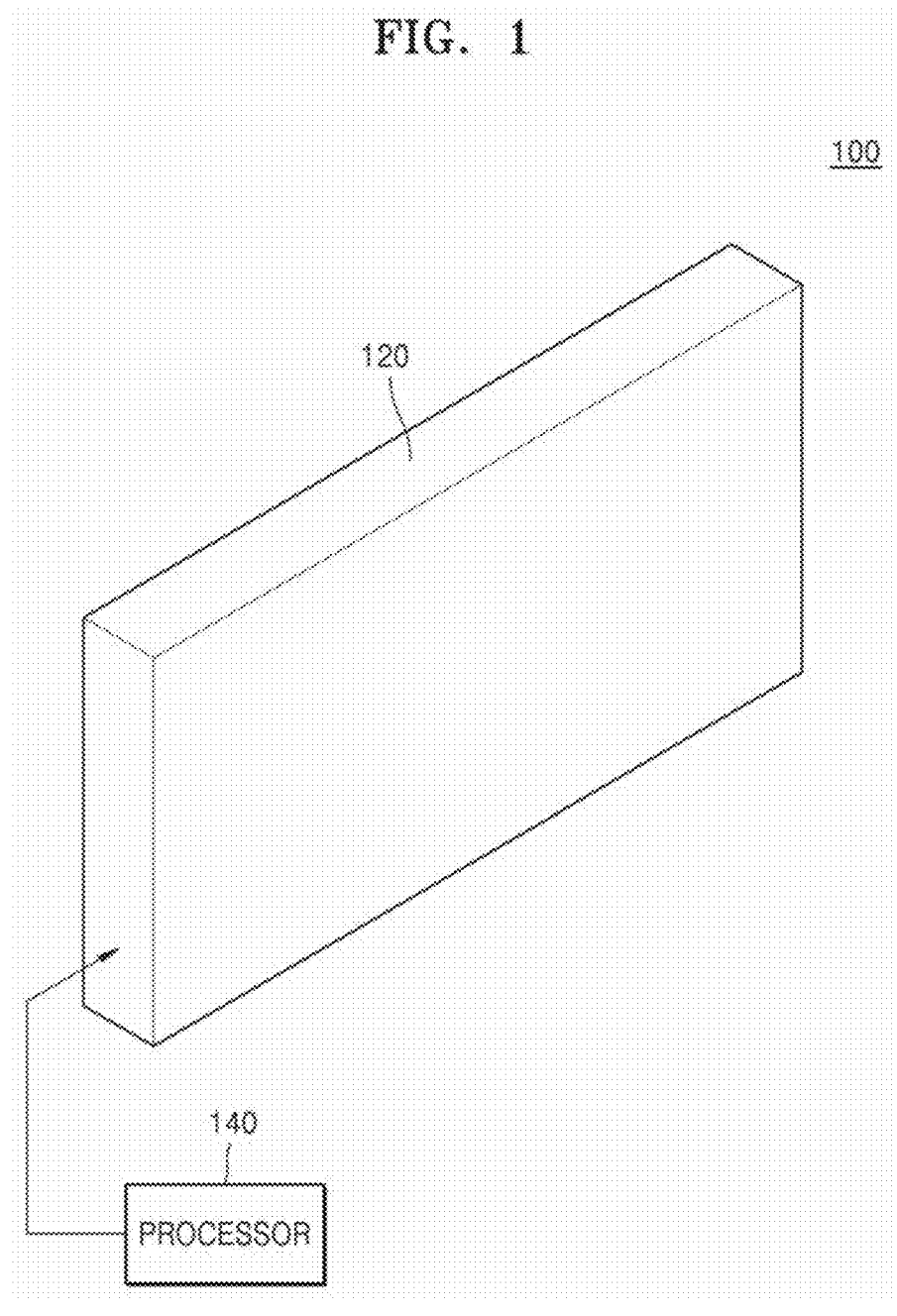
FIG. 1 is a perspective view of a complex light modulator according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, example embodiments of the disclosure are described below in detail with reference to the accompanying drawings. Throughout the drawings, like reference numerals denote like elements, and sizes of components in the drawings may be exaggerated for convenience of explanation and clarity. As the embodiments described below are examples, other modifications may be produced from the example embodiments.

Hereinafter, when a constituent element is disposed "above" or "on" to another constituent element, the constituent element may be only directly on the other constituent element or above the other constituent elements in a non-contact manner.

The expression of singularity in the specification includes the expression of plurality unless clearly specified otherwise in context. In addition, it will be further understood that the terms "comprises" and/or "comprising" used herein specify the presence of stated features or components, but do not preclude the presence or addition of one or more other features or components.

Furthermore, terms such as " . . . portion," " . . . unit," " . . . module," and " . . . block" stated in the specification may signify a unit to process at least one function or operation.

Figure 2:
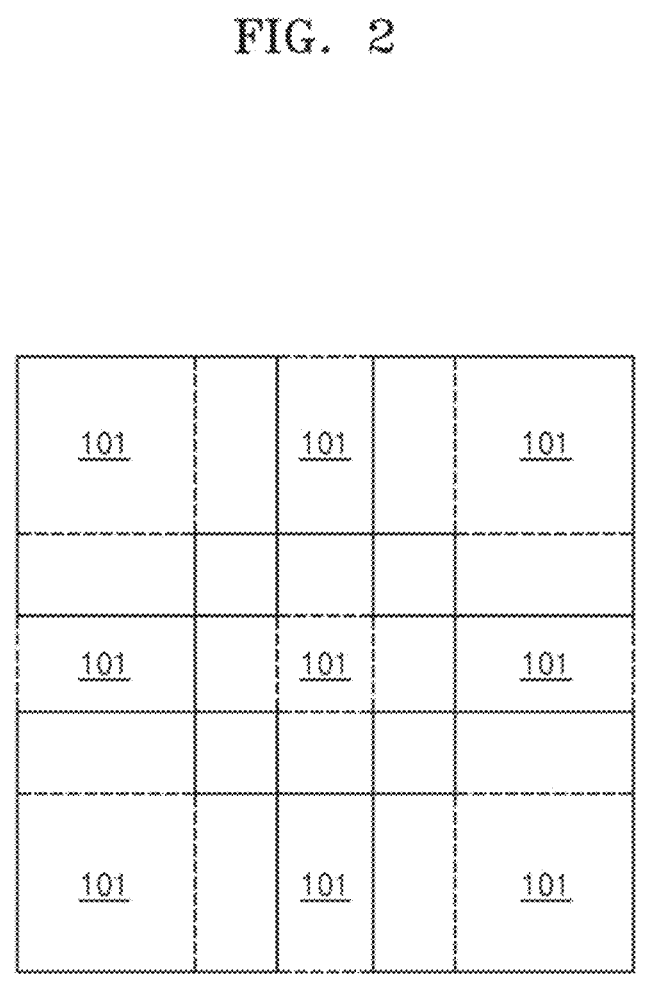
Figure 3:
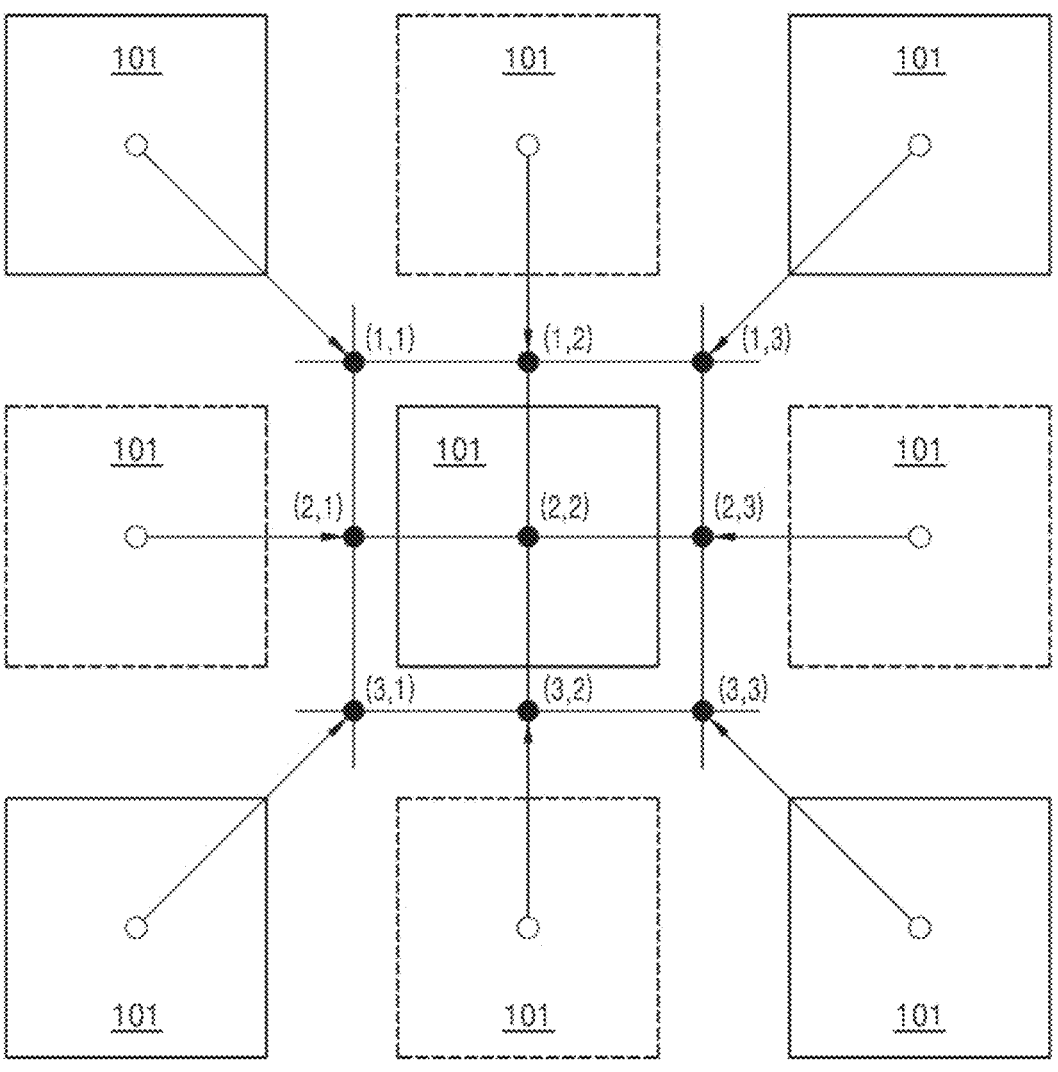
FIG. 3 is a conceptual view illustrating complex pixels.

FIG. 1 is a perspective view of a complex light modulator 100 according to an example embodiment. FIG. 2 is a conceptual view illustrating complex pixels. FIG. 3 is a conceptual view illustrating complex pixels. FIG. 4 is a conceptual view illustrating sub-complex pixels.

Referring to FIG. 1, the complex light modulator 100 may be provided. The complex light modulator 100 may modulate the amplitude of light and phase of light. The complex light modulator 100 may include a complex light modulation element 120 and a processor 140. The complex light modulation element 120 may adjust the amplitude of light and the phase of light. For example, the complex light modulation element 120 may include an amplitude modulator and a phase modulator. The amplitude modulator may include a spatial light modulator. For example, the amplitude modulator may include a liquid crystal device (LCD), a semiconductor modulator, a digital micro-mirror device (DMD), or a liquid crystal on silicon (LCoS). The amplitude modulator may be connected to the processor 140 in a wired or wireless manner. The amplitude modulator may receive a hologram data signal, for example, a computer generated hologram (CGH) data signal, from the processor 140. The amplitude modulator may control the amplitude of light according to a hologram data signal from the processor 140. Although the amplitude modulator is illustrated as including a transmissive spatial light modulator, embodiments are not limited thereto. In another example, the amplitude modulator may include a reflective spatial light modulator.

The phase modulator may modulate the phase of light. The phase modulator may include a phase plate or a spatial light modulator, for example, an LCD, a semiconductor modulator, a DMD, or an LCoS. When the phase modulator includes a phase plate, the phase modulator may include patterns to delay the phase of light by increasing an optical distance of light passing through the phase modulator. For example, the phase modulator may include phase modulation patterns having different thicknesses or a geometric phase (GP) plate.

Referring to FIGS. 2 and 3, the complex light modulation element 120 may have complex pixels 101 that are arranged in two dimensions. For example, the complex pixels 101 may be arranged such that the center points thereof are respectively located at the intersections of a plurality of rows arranged in parallel in a horizontal direction and a plurality of columns arranged in parallel in a vertical direction. The complex light modulation element 120 of the example embodiment may include the arrangement of the complex pixels 101 of FIG. 2, and FIG. 3 illustrates that the center points of the complex pixels 101 are respectively located at the intersections of a plurality of rows and a plurality of columns. The complex pixels 101 may be pixels for forming a complex wave field to generate a holographic image. For brevity of explanation, in FIG. 2, among the complex pixels 101, complex pixels are arranged in a 3×3 matrix. Hereinafter, a position (m,n) refers to a position where an m-th row intersects with an n-th column.

Each of the complex pixels 101 may have complex light modulation characteristics. The complex light modulation characteristics may be the characteristics of modulating the phase of light and amplitude of light. The phase modulation characteristics of the complex pixels 101 may be defined by the phase modulator, and the amplitude modulation characteristics may be substantially defined by the amplitude modulator. The phase modulator and the amplitude modulator are described below. The complex light modulation characteristics of the complex pixels 101 may be represented by a phaser. In the present disclosure, a phaser indicating the complex light modulation characteristics of the complex pixels 101 is referred to as a modulation phaser. The modulation phaser may be expressed as follows.

A modulation phaser of a complex pixel arranged at a position (m,n): $A_{(m,n)}e^{j\Theta_{(m,n)}}$ Here, $A$ (m,n) is the amplitude of a complex pixel arranged at a position (m,n), and $\theta_{(m,n)}$ is the phase of a complex pixel arranged at a position (m,n).

The complex light modulator 100 may generate a hologram pattern by using a Burckhardt encoding-based method. In the present disclosure, a hologram pattern may refer to a pattern formed by the complex pixels 101.

Referring to FIG. 4, each of the complex pixels 101 may be defined by nine sub-complex pixels 102 that are arranged in a 3×3 matrix. For brevity of explanation, the sub-complex pixels 102 with respect to one complex pixel 101 are illustrated in FIG. 4. Each of the sub-complex pixels 102 may have the complex light modulation characteristics. The phase modulation characteristics of the sub-complex pixels 102 may be defined by the phase modulator, and the amplitude modulation characteristics of the sub-complex pixels 102 may be defined by the amplitude modulator. Each of the light modulation characteristics of the sub-complex pixels 102 may be represented by sub-phasers. The sub-phasers may be parallel to three-phase unit phasers. For example, the unit phasers may be expressed as $$e^{j0\pi}, e^{j\frac{2}{3}\pi}, \text{ and } e^{j\frac{4}{3}\pi}.$$

The sum of the sub-phasers may be identical to the modulation phaser. For example, the modulation phaser may be divided into the sub-phasers. Accordingly, the complex light modulation characteristics of the complex pixel 101 may be implemented by the sub-complex pixels 102. A relation of the sum of the modulation phaser and the sub-phasers may be expressed as follows in Equation 1.

$$A_{(m,n)}e^{j\theta(m,n)} = A1_{(m,n)}e^{j0\pi} + A2_{(m,n)}e^{j\frac{2}{3}\pi} + A3_{(m,n)}e^{j\frac{4}{3}\pi} \quad \text{[Equation 1]}$$

Here, A (m,n) is the amplitude of a complex pixel arranged at a position (m,n), $\theta_{(m,n)}$ is the phase of a complex pixel arranged at a position (m,n), A1(m,n) is the sum of the amplitudes of sub-complex pixels having a phase of 0°, A2(m,n) is the sum of the amplitudes of sub-complex pixels having a phase of 120°, and A3(m,n) is the sum of the amplitudes of sub-complex pixels having a phase of 240°.

As illustrated in FIG. 2, the complex pixels 101 neighboring each other may share some of the sub-complex pixels 102. In the present disclosure, a combination of the complex pixels 101 sharing the sub-complex pixels 102 is referred as a covalent bond complex pixel group, and a combination of complex pixels that do not share the sub-complex pixels 102 is referred to as an uncoupled-type complex pixel group. The covalent bond-type complex pixel group may be generated based on the uncoupled-type complex pixel group. Hereinafter, a method of generating a covalent bond-type complex pixel group is described.

Figure 6:
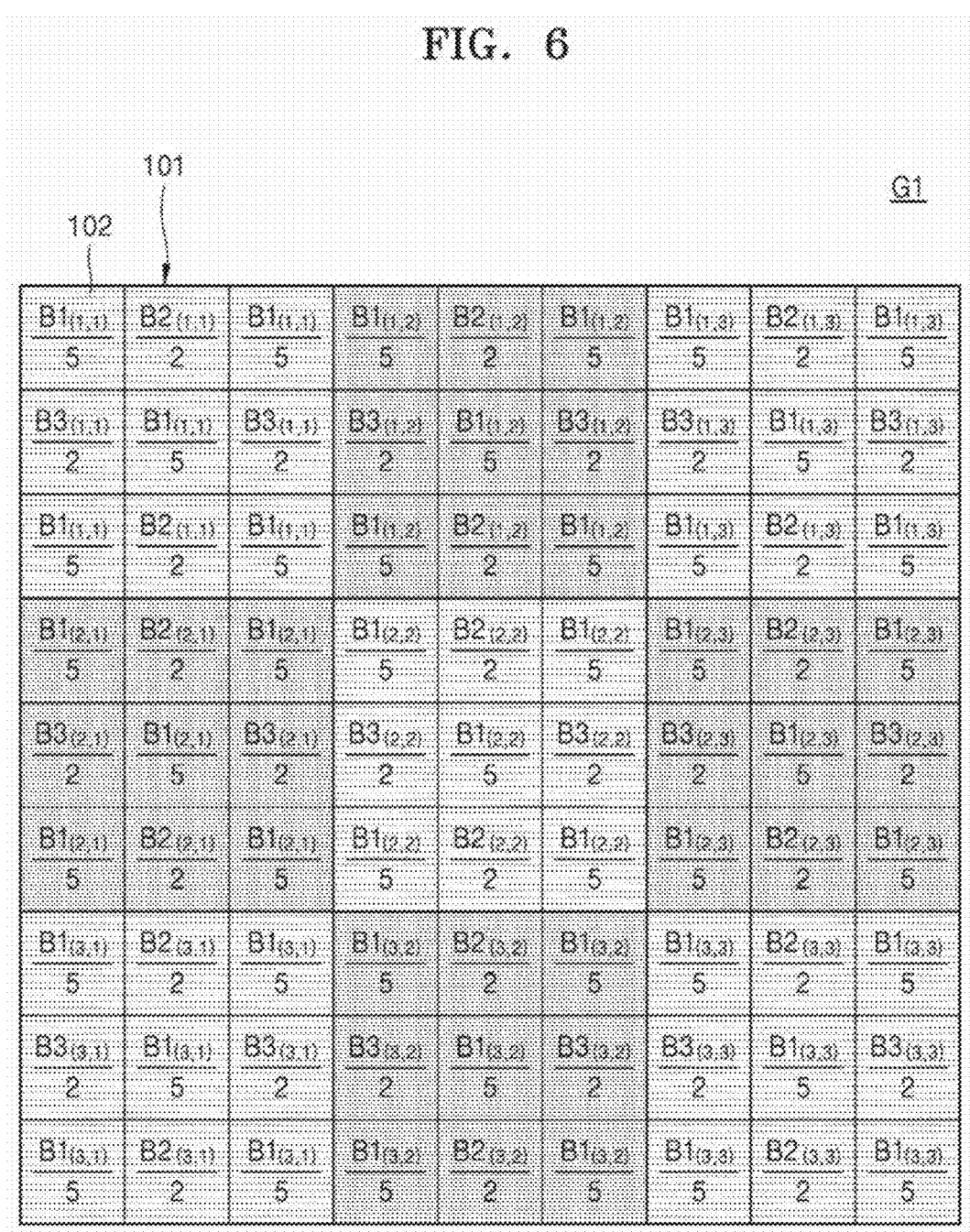
FIG. 6 is a conceptual view illustrating an uncoupled-type complex pixel group.
Figure 7:
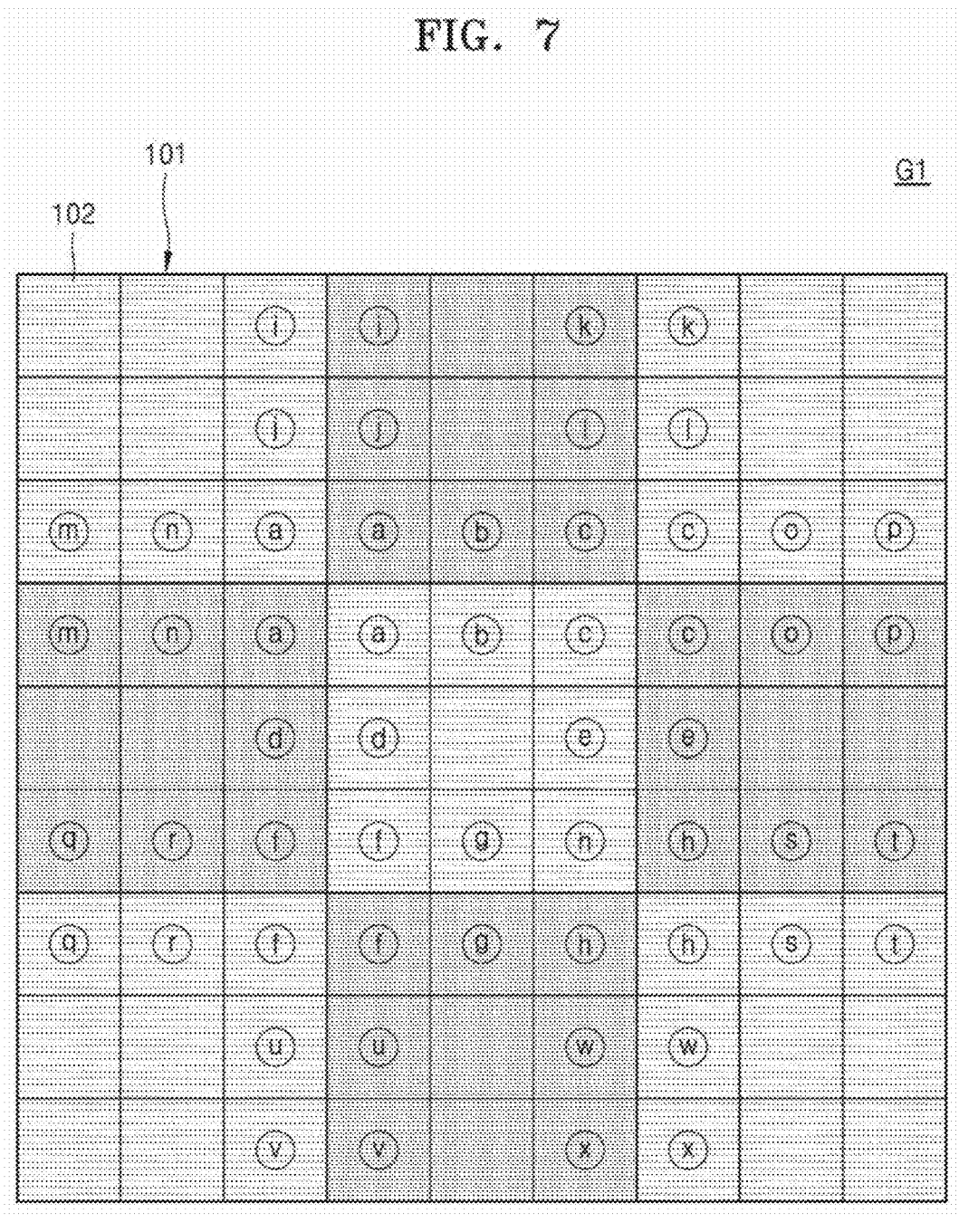
FIG. 7 is a conceptual view illustrating an uncoupled-type complex pixel group.
Figure 8:
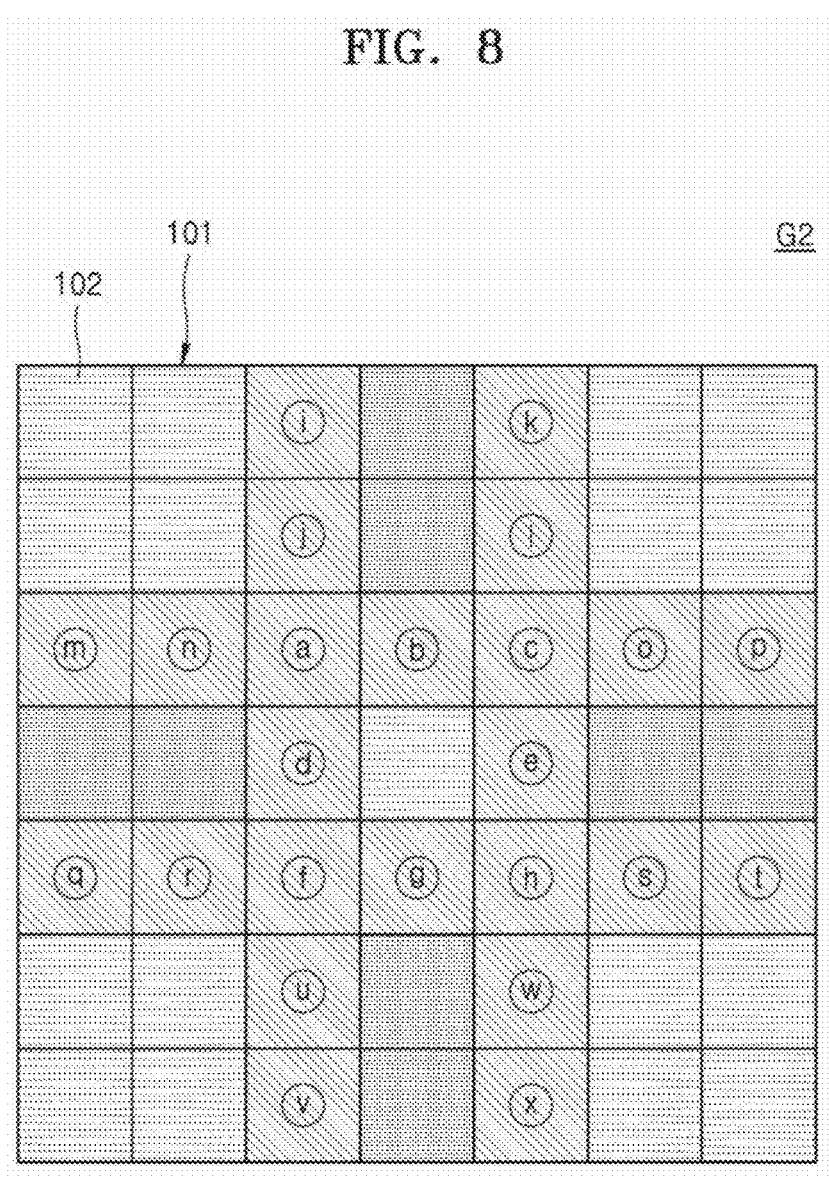
FIG. 8 is a conceptual view illustrating a covalent bond-type complex pixel group.

FIG. 5 is a flowchart of a method of generating a covalent bond-type complex pixel group. FIG. 6 is a conceptual view illustrating an uncoupled-type complex pixel group. FIG. 7 is a conceptual view illustrating an uncoupled-type complex pixel group. FIG. 8 is a conceptual view illustrating a covalent bond-type complex pixel group. For brevity of explanation, a covalent bond-type complex pixel group and an uncoupled-type complex pixel group having complex pixels arranged in a 3×3 matrix are described.

Referring to FIGS. 5 and 6, an uncoupled-type complex pixel group G1 may be generated. The complex light modulation characteristics of the complex pixels 101 arranged in two dimensions may be determined (S100). The complex pixels 101 located at positions (1,1), (1,2), (1,3), (2,1), (2,2), (2,3), (3,1), (3,2), and (3,3) are referred to as a complex pixel (1,1), a complex pixel (1,2), a complex pixel (1,3), a complex pixel (2,1), a complex pixel (2,2), a complex pixel (2,3), a complex pixel (3,1), a complex pixel (3,2), and a complex pixel (3,3), respectively. Each of the complex light modulation characteristics of the complex pixels (1,1) to (3,3) may be represented by the modulation phasers. The modulation phasers (or the complex light modulation characteristics of the complex pixels 101) may be determined based on amplitude information and phase information of a holographic image assigned to each of the complex pixels 101, according to the resolution of the complex light modulation element 120 including a covalent bond-type complex pixel group G2.

Each of the complex pixels (1,1) to (3,3) may include the sub-complex pixels 102 arranged in a 3×3 matrix. With respect to each of the complex pixels (1,1) to (3,3), the sub-complex pixels 102 arranged at the positions (1,1), (1,2), (1,3), (2,1), (2,2), (2,3), (3,1), (3,2), and (3,3) are referred to as a sub-complex pixel (1,1), a sub-complex pixel (1,2), a sub-complex pixel (1,3), a sub-complex pixel (2,1), a sub-complex pixel (2,2), a sub-complex pixel (2,3), a sub-complex pixel (3,1), a sub-complex pixel (3,2), and a sub-complex pixel (3,3), respectively.

The complex light modulation characteristics of the complex pixels (1,1) to (3,3) may be implemented by the sub-complex pixels (1,1) to (3,3) corresponding thereto. The complex light modulation characteristics of the sub-complex pixels (1,1) to (3,3) may be determined based on the complex light modulation characteristics of the complex pixels (1,1) to (3,3) (S200). For example, the sub-phasers of the sub-complex pixels (1,1) to (3,3) of the complex pixels (1,1) to (3,3) may be calculated (obtained) based on the modulation phasers of the complex pixels (1,1) to (3,3). The sub-phasers may be parallel to the three-phase unit phasers. For example, the unit phasers may be expressed as $$e^{j0\pi}, e^{j\frac{2}{3}\pi}, \text{ and } e^{j\frac{4}{3}\pi}.$$

The sum of the sub-phasers may be identical to the modulation phaser. For example, the modulation phaser may be divided into the sub-phasers. The sum of the modulation phaser of each of the complex pixels (1,1) to (3,3) and the sub-phasers of the sub-complex pixels (1,1) to (3,3) may be expressed in Equation 2 as follows.

$$B_{(m,n)}e^{j\theta(m,n)} = B1_{(m,n)}e^{j0\pi} + B2_{(m,n)}e^{j\frac{2}{3}\pi} + B3_{(m,n)}e^{j\frac{4}{3}\pi} \quad \text{[Equation 2]}$$

Here, B (m,n) is the amplitude of a complex pixel arranged at a position (m,n), $\theta_{(m,n)}$ is the phase of a complex pixel arranged at a position (m,n), B1(m,n) is the sum of the amplitudes of sub-complex pixels having a phase of 0°, B2(m,n) is the sum of the amplitudes of sub-complex pixels having a phase of 120°, and B3(m,n) is the sum of the amplitudes of sub-complex pixels having a phase of 240°.

The sub-phasers of the sub-complex pixels (1,1) to (3,3) of the complex pixel 101 arranged at a position (m,n) may be determined such that phases and amplitudes have a point symmetry. The sub-complex pixels (1,1), (3,3), (1,3), (3,1), and (2,2) may have a first phase and a first amplitude. For example, the first phase may be 0°, and the first amplitude may be expressed as $$\frac{B1_{(m,n)}}{5}.$$

The sub-complex pixels (1,2) and (3,2) may have a second phase and a second amplitude. For example, the second phase may be 120°, and the second amplitude may be expressed as $$\frac{B2_{(m,n)}}{2}.$$

The sub-complex pixels (2,1) and (2,3) may have a third phase and a third amplitude. For example, the third phase may be 240°, and the third amplitude may be expressed as $$\frac{B3_{(m,n)}}{2}.$$

In FIG. 6, the phasers illustrated in the sub-complex pixels 102 may respectively be the sub-phasers of the sub-complex pixels 102 corresponding thereto. When the phases and amplitudes of the sub-complex pixels (1,1) to (3,3) have a point symmetry, noise, for example, conjugate noise or 0-th order noise, of a hologram output from the complex light modulation element 120 may be reduced or removed.

Referring to FIGS. 5 and 7, overlapping target pixels (a) to (x) may be selected from among the sub-complex pixels 102 (S300). The sub-complex pixels 102 referenced by (a) to (x) in FIG. 7 are referred to as the overlapping target pixels (a) to (x). The overlapping target pixels (a) to (x) may be arranged in the different complex pixels 101, may have the same phase, and may be the sub-complex pixels 102 adjacent to each other. The overlapping target pixels (a) to (x) having same reference numeral may overlap each other when the covalent bond-type complex pixel group G2 is formed. For brevity of explanation, operation S300 is described mainly regarding the complex pixel (2,2) of FIG. 7.

The sub-complex pixel (1,1) of the complex pixel (2,2), the sub-complex pixel (3,3) of the complex pixel (1,1), the sub-complex pixel (3,1) of the complex pixel (1,2), and the sub-complex pixel (1,3) of the complex pixel (2,1) may be (a) overlapping target pixels ((a)) that are adjacent to each other and have a phase of 0°.

The sub-complex pixel (1,2) of the complex pixel (2,2) and the sub-complex pixel (3,2) of the complex pixel (1,2) may be b overlapping target pixels (b) that are adjacent to each other and have a phase of 120°.

The sub-complex pixel (1,3) of the complex pixel (2,2), the sub-complex pixel (3,3) of the complex pixel (1,2), the sub-complex pixel (3,1) of the complex pixel (1,3), and the sub-complex pixel (1,1) of the complex pixel (2,3) may be (c) overlapping target pixels ((c)) that are adjacent to each other and have a phase of 0°.

The sub-complex pixel (2,1) of the complex pixel (2,2) and the sub-complex pixel (2,3) of the complex pixel (2,1) may be (d) overlapping target pixels ((d))) that are adjacent to each other and have a phase of 240°.

The sub-complex pixel (2,3) of the complex pixel (2,2) and the sub-complex pixel (2,1) of the complex pixel (2,3) may be (e) overlapping target pixels ((e)) that are adjacent to each other and have a phase of 240°.

The sub-complex pixel (3,1) of the complex pixel (2,2), the sub-complex pixel (3,3) of the complex pixel (2,1), the sub-complex pixel (1,3) of the complex pixel (3,1), and the sub-complex pixel (1,1) of the complex pixel (3,2) may be (f) overlapping target pixels ((f)) that are adjacent to each other and have a phase of 0°.

The sub-complex pixel (3,2) of the complex pixel (2,2) and the sub-complex pixel (1,2) of the complex pixel (3,2) may be (g) overlapping target pixels ((g)) that are adjacent to each other and have a phase of 120°.

The sub-complex pixel (3,3) of the complex pixel (2,2), the sub-complex pixel (3,1) of the complex pixel (2,3), the sub-complex pixel (1,3) of the complex pixel (3,2), and the sub-complex pixel (1,1) of the complex pixel (3,3) may be (h) overlapping target pixels ((h)) that are adjacent to each other and have a phase of 0°.

The (i) to (x) overlapping target pixels ((i) to (x)) may be selected in the same manner as the (a) to (h) overlapping target pixels ((a) to (h)).

Referring to FIGS. 5 and 8, as the overlapping target pixels (a) to (x) ((a) to (x) of FIG. 7) overlap one another, the covalent bond-type complex pixel group G2 may be generated. The overlapping target pixels (a) to (x) ((a) to (x) of FIG. 7) may overlap one another to generate the (a) to (x) overlapping pixels ((a) to (x)). The overlapping target pixels having the same reference numeral may overlap each other to generate one overlapping pixel. One overlapping pixel may have the same reference numeral as the overlapping target pixels that generate the overlapping pixel. For example, as the (a) overlapping target pixels (a) of FIG. 7 overlap each other, an (a) overlapping pixel ((a)) may be generated. The (a) to (x) overlapping pixels ((a) to (x)) may be parts of the sub-complex pixels 102 constituting the complex pixels 101.

The complex light modulation characteristics of the (a) to (x) overlapping pixels ((a) to (x)) may be expressed as the sum of the sub-phasers of sub-complex pixels, that is, the overlapping target pixels (a) to (x) ((a) to (x) of FIG. 7) that generate the overlapping pixels. The phases of the (a) to (x) overlapping pixels ((a) to (x)) may be the same as the phase of the overlapping target pixels ((a) to (x) of FIG. 7) that generate the overlapping pixels. The amplitudes of the (a) to (x) overlapping pixels ((a) to (x)) may be the same as the sum of the amplitudes of the overlapping target pixels ((a) to (x)) of FIG. 7) that generate the overlapping pixels. The complex pixels 101 that include the overlapping target pixels that generate one overlapping pixel may share the overlapping pixel. For example, one overlapping pixel may be one of the sub-complex pixels 102 arranged in a 3×3 matrix that constitute the complex pixel 101 that includes each of the overlapping target pixels that generate the overlapping pixel. Hereinafter, operation S400 is described based on the complex pixel (2,2).

As the sub-complex pixel (1,1) of the complex pixel (2,2), the sub-complex pixel (3,3) of the complex pixel (1,1), the sub-complex pixel (3,1) of the complex pixel (1,2), and the sub-complex pixel (1,3) of the complex pixel (2,1) overlap one another, an (a) overlapping pixel ((a)) may be generated. The phase of the (a) overlapping pixel ((a)) may be 0°. The amplitude of the (a) overlapping pixel ((a)) may be expressed as $$\frac{B1_{(1,1)}}{5} + \frac{B1_{(1,2)}}{5} + \frac{B1_{(2,1)}}{5} + \frac{B1_{(2,2)}}{5}.$$

The complex pixel (2,2), the complex pixel (1,1), the complex pixel (1,2), and the complex pixel (2,1) may share the (a) overlapping pixel ((a)).

As the sub-complex pixel (1,2) of the complex pixel (2,2) and the sub-complex pixel (3,2) of the complex pixel (1,2) overlap one another, a (b) overlapping pixel ((b)) may be generated. The phase of the (b) overlapping pixel (b) may be 120°. The amplitude of the (b) overlapping pixel ((b)) may be expressed as $$\frac{B2_{(1,2)}}{2} + \frac{B2_{(2,2)}}{2}.$$

The complex pixel (2,2) and the complex pixel (1,2) may share the ⓑ overlapping pixel (ⓑ).

As the sub-complex pixel (1,3) of the complex pixel (2,2), the sub-complex pixel (3,3) of the complex pixel (1,2), the sub-complex pixel (3,1) of the complex pixel (1,3), and the sub-complex pixel (1,1) of the complex pixel (2,3) overlap one another, a ⓒ overlapping pixel (ⓒ) may be generated. The phase of the ⓒ overlapping pixel (ⓒ) may be 0°. The amplitude of the ⓒ overlapping pixel (ⓒ) may be expressed as $$\frac{B1_{(1,2)}}{5} + \frac{B1_{(1,2)}}{5} + \frac{B1_{(2,2)}}{5} + \frac{B1_{(2,3)}}{5}.$$

The complex pixel (2,2), the complex pixel (1,2), the complex pixel (1,2), and the complex pixel (2,3) may share the ⓒ overlapping pixel (ⓒ).

As the sub-complex pixel (2,1) of the complex pixel (2,2) and the sub-complex pixel (2,3) of the complex pixel (2,1) overlap each other, a ⓓ overlapping pixel (ⓓ) may be generated. The phase of the ⓓ overlapping pixel (ⓓ) may be 240°. The amplitude of the ⓓ overlapping pixel (ⓓ) may be expressed as $$\frac{B3_{(2,1)}}{2} + \frac{B3_{(2,2)}}{2}.$$

The complex pixel (2,2) and the complex pixel (2,1) may share the ⓓ overlapping pixel (ⓓ).

As the sub-complex pixel (2,3) of the complex pixel (2,2) and the sub-complex pixel (2,1) of the complex pixel (2,3) overlap each other, an ⓔ overlapping pixel (ⓔ) may be generated. The phase of the ⓔ overlapping pixel (ⓔ) may be 240°. The amplitude of the ⓔ overlapping pixel (ⓔ) may be expressed as $$\frac{B3_{(2,2)}}{2} + \frac{B3_{(2,3)}}{2}.$$

The complex pixel (2,2) and the complex pixel (2,3) may share the ⓔ overlapping pixel (ⓔ).

As the sub-complex pixel (3,1) of the complex pixel (2,2), the sub-complex pixel (3,3) of the complex pixel (2,1), the sub-complex pixel (1,3) of the complex pixel (3,1), and the sub-complex pixel (1,1) of the complex pixel (3,2) overlap one another, an ⓕ overlapping pixel (ⓕ) may be generated. The phase of the ⓕ overlapping pixel (ⓕ) may be 0°. The amplitude of the ⓕ overlapping pixel (ⓕ) may be expressed as $$\frac{B1_{(2,1)}}{5} + \frac{B1_{(2,2)}}{5} + \frac{B1_{(3,1)}}{5} + \frac{B1_{(3,2)}}{5}.$$

The complex pixel (2,2), the complex pixel (2,1), the complex pixel (3,1), and the complex pixel (3,2) may share the ⓕ overlapping pixel (ⓕ).

As the sub-complex pixel (3,2) of the complex pixel (2,2) and the sub-complex pixel (1,2) of the complex pixel (3,2) overlap each other, a ⓖ overlapping pixel (ⓖ) may be generated. The phase of the ⓖ overlapping pixel (ⓖ) may be 120°. The amplitude of the ⓖ overlapping pixel (ⓖ) may be expressed as $$\frac{B2_{(2,2)}}{2} + \frac{B2_{(3,2)}}{2}.$$

The complex pixel (2,2) and the complex pixel (3,2) may share the ⓖ overlapping pixel (ⓖ).

As the sub-complex pixel (3,3) of the complex pixel (2,2), the sub-complex pixel (3,1) of the complex pixel (2,3), the sub-complex pixel (1,3) of the complex pixel (3,2), and the sub-complex pixel (1,1) of the complex pixel (3,3) overlap one another, an ⓗ overlapping pixel (ⓗ) may be generated. The phase of the ⓗ overlapping pixel (ⓗ) may be 0°. The amplitude of the ⓗ overlapping pixel (ⓗ) may be expressed as $$\frac{B1_{(2,2)}}{5} + \frac{B1_{(2,3)}}{5} + \frac{B1_{(3,2)}}{5} + \frac{B1_{(3,3)}}{5}.$$

The complex pixel (2,2), the complex pixel (2,3), the complex pixel (3,2), and the complex pixel (3,3) may share the ⓗ overlapping pixel (ⓗ).

In the method described above, the ① to ⓧ overlapping pixels (① to ⓧ) may be generated. The complex pixels (1,1) and (1,2) may share the ① and ① overlapping pixels (① and ①). The complex pixels (1,2) and (1,3) may share the ⓚ and ① overlapping pixels (ⓚ and ①). The complex pixels (1,1) and (2,1) may share the ⓜ and ⓝ overlapping pixels (ⓜ and ⓝ). The complex pixels (1,3) and (2,3) may share the ⓞ and ⓟ overlapping pixels (ⓞ and ⓟ). The complex pixels (2,1) and (3,1) may share the ⓠ and ⓡ overlapping pixels (ⓠ and ⓡ). The complex pixels (2,3) and (3,3) may share the ⓢ and ⓣ overlapping pixels (ⓢ and ⓣ). The complex pixels (3,1) and (3,2) may share the ⓥ and ⓤ overlapping pixels (ⓥ and ⓤ). The complex pixels (3,2) and (3,3) may share the w and x overlapping pixels (ⓦ and ⓧ).

The complex light modulation element 120 according to the example embodiment may have substantially the same effect as a case in which the amplitudes and phases of the sub-complex pixels 102 have a point symmetry, while each of the complex pixels 101 includes the sub-complex pixels 102 arranged in a 3×3 matrix. For example, in the complex light modulation element 120, conjugate noise or 0-th order noise may be reduced or may not be substantially generated.

The resolution of the complex light modulation element 120 may be determined by the density of the complex pixels 101. For the uncoupled-type complex pixel group G1, the complex pixels 101 may not be shared with each other and may include the sub-complex pixels 102 arranged in a 3×3 matrix. For example, to define the complex pixels 101 arranged in a $^{m \times n}$ matrix, $(^{3 \cdot m \times 3 \cdot n})$ pixels of the sub-complex pixels 102 are needed.

For the complex light modulation element 120 of the example embodiment including the covalent bond-type complex pixel group G2, while including the sub-complex pixels 102 arranged in a 3×3 matrix, each of the complex pixels 101 may share some sub-complex pixels, that is, the overlapping pixels (ⓐ to ⓧ). For example, the complex pixels 101 arranged in the m×1 matrix may be defined by $(3 \cdot m - (m-1)) \times (3 \cdot n - (n-1))$, that is, $(2 \cdot m+1) \times (2 \cdot n+1)$, pixels of the sub-complex pixels 102.

When the size of a display area (an area where the complex pixels 101 are arranged) of the complex light modulator including the uncoupled-type complex pixel group G1 is the same as the size of a display area of the complex light modulation element 120 of the example embodiment including the covalent bond-type complex pixel group G2, the complex light modulation element 120 of the disclosure may include more complex pixels 101 than the complex light modulator including the uncoupled-type complex pixel group G1. Accordingly, the resolution of the complex light modulation element 120 of the disclosure may be higher than that of the complex light modulator including the uncoupled-type complex pixel group G1.

Figure 9:
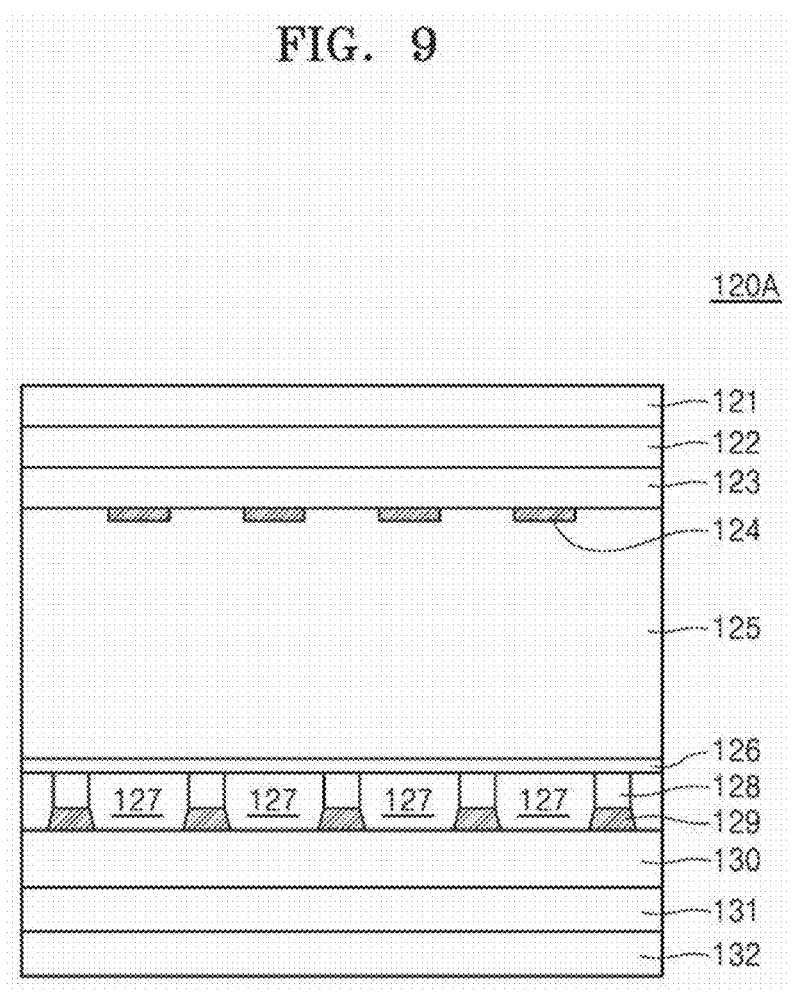
FIG. 9 is a cross-sectional view of a complex light modulation element of FIG. 1 according to an example embodiment.
Figure 10:
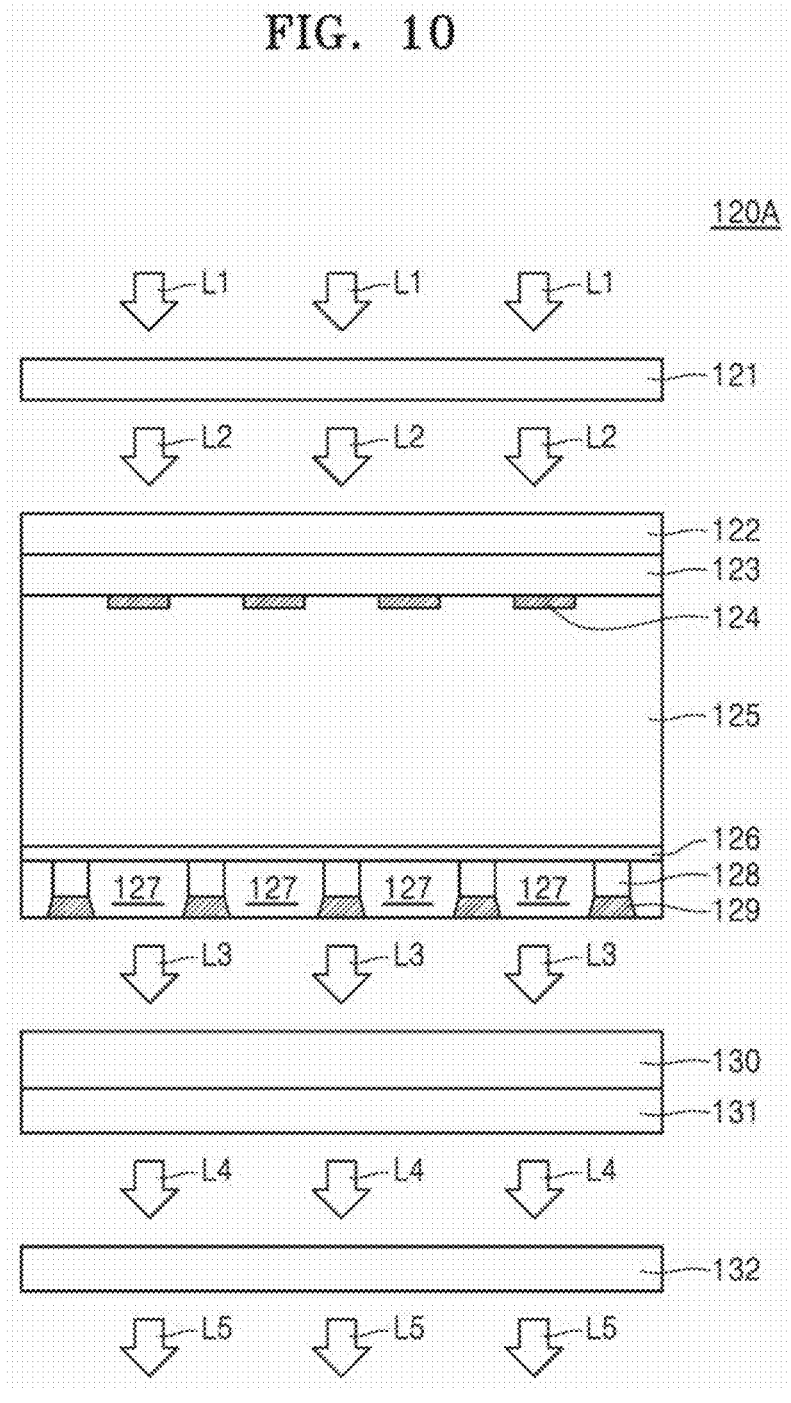
FIG. 10 illustrates light passing through the complex light modulation element of FIG. 9.
Figures 11, 12:
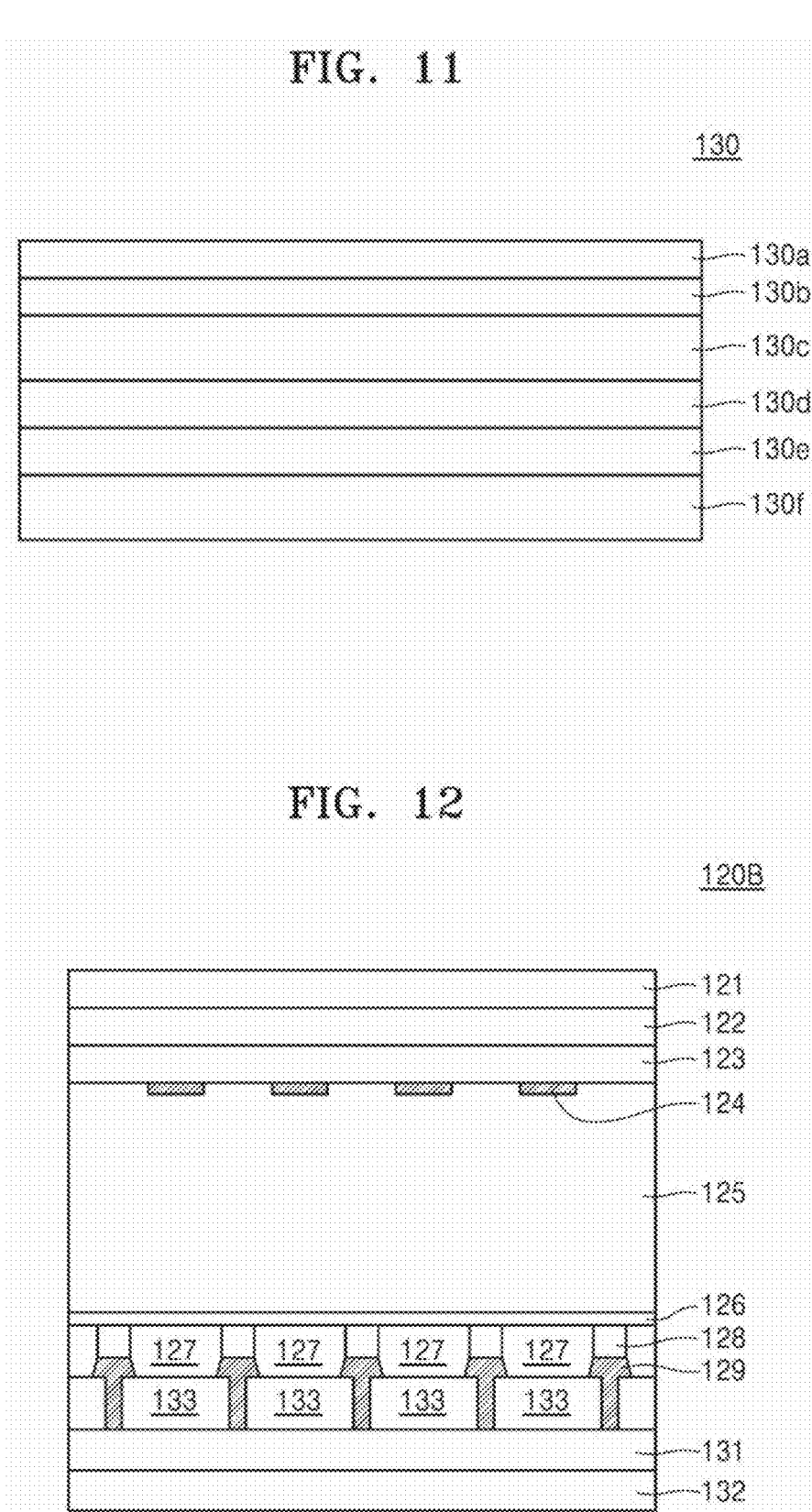
FIG. 11 is a cross-sectional view of a geometric phase (GP) plate of FIG. 9.
FIGS. 12 and 13 are cross-sectional views of the complex light modulation element of FIG. 1 according to an example embodiment.

FIG. 9 is a cross-sectional view of the complex light modulation element 120 of FIG. 1 according to an example embodiment. FIG. 10 illustrates light passing through a complex light modulation element 120A of FIG. 9. FIG. 11 is a cross-sectional view of a GP plate 130 of FIG. 9.

Referring to FIGS. 9 and 10, the complex light modulation element 120A may be provided. The complex light modulation element 120A may include the covalent bond-type complex pixel group G2 described with reference to FIGS. 2 to 8. Accordingly, the complex light modulation element 120A may include the complex pixels 101 having the sub-complex pixels 102 and sharing some sub-complex pixels, that is, the overlapping pixels. The complex light modulation element 120A may include a first polarization plate 121, a first substrate 122, a thin film transistor (TFT) layer 123, sub-pixel electrodes 124, a liquid crystal layer 125, a common electrode layer 126, color filters 127, an insulating layer 128, a black matrix 129, the GP plate 130, a second substrate 131, and a second polarization plate 132. The first polarization plate 121 and the second polarization plate 132 may be arranged to face each other.

First light L1 may be incident on the first polarization plate 121. The first light L1 may be light incident on the complex light modulation element 120A from the outside of the complex light modulation element 120A. The first polarization plate 121 may convert the first light L1 incident on the complex light modulation element 120A into second light L2 that is circularly polarized. For example, the second light L2 may be right-circular polarized.

The first substrate 122, the TFT layer 123, the sub-pixel electrodes 124, the liquid crystal layer 125, and the common electrode layer 126 may be provided between the first polarization plate 121 and the second polarization plate 132. The first substrate 122, the TFT layer 123, the sub-pixel electrodes 124, the liquid crystal layer 125, and the common electrode layer 126 may be sequentially arranged in a direction from the first polarization plate 121 to the second polarization plate 132.

The first substrate 122 may be a transparent substrate. For example, the first substrate 122 may be a glass substrate. The TFT layer 123 may include TFTs. The TFTs may be arranged in each of sub-complex pixels. The sub-pixel electrodes 124 may be respectively and electrically connected to the TFTs. Under control of the TFTs, a voltage may be applied to the sub-pixel electrodes 124. The common electrode layer 126 may include a transparent electrode. For example, the common electrode layer 126 may include an indium tin oxide (ITO). The liquid crystal layer 125 may include, for example, twisted nematic liquid crystal (TNLC).

The TFT layer 123, the sub-pixel electrodes 124, the liquid crystal layer 125, and the common electrode layer 126 may be referred to as the amplitude modulator. The amplitude modulator may adjust the amplitude of the second light L2 for each sub-complex pixel by controlling the liquid crystal alignment in the liquid crystal layer 125. The amplitude modulation characteristics of the sub-complex pixel may be substantially the same as that described with reference to FIGS. 2 to 8. The liquid crystal alignment in the liquid crystal layer 125 may be adjusted by an electric field applied to the liquid crystal layer 125. The electric field applied to the liquid crystal layer 125 may be adjusted by a voltage difference between the sub-pixel electrodes 124 and the common electrode layer 126. When the common electrode layer 126 has a single voltage, the electric field applied to the liquid crystal layer 125 may be adjusted by a voltage applied to the sub-pixel electrodes 124. The voltage applied to the sub-pixel electrodes 124 may be adjusted by TFTs included in the TFT layer 123.

The color filters 127 may be provided between the amplitude modulator and the second polarization plate 132. The color filters 127 may each receive the second light L2 and emit light corresponding to pass wavelength bands. The light emitted from the color filters 127 may be referred to as third light L3. When the liquid crystal layer 125 includes TNLC, the third light L3 may be left-circular polarized. In an example, part of the third light L3 may be right-circular polarized. The part of the third light L3 that is right-circular polarized may be noise. The color filters 127 may be arranged in a direction parallel to the common electrode layer 126. The color filters 127 may be spaced apart from each other. The color filters 127 may include various types of different color filters. For example, the color filters 127 may include filters for transmitting red light, filters for transmitting green light, and filters for transmitting blue light. An arrangement pattern of the color filters 127 may be set as necessary.

The black matrix 129 may be provided between the color filters 127. The black matrix 129 may prevent crosstalk between the sub-complex pixels by blocking light.

The insulating layer 128 may fill a space between the color filters 127 left after the black matrix 129 is provided. A surface of the insulating layer 128 facing the common electrode layer 126 may be disposed at substantially same height as surfaces of the color filters 127 facing the common electrode layer 126. For example, the surface of the insulating layer 128 facing the common electrode layer 126 may be coplanar with the surfaces of the color filters 127 facing the common electrode layer 126.

The GP plate 130 may be provided between the color filters 127 and the second polarization plate 132. However, in another example, the GP plate 130 may be disposed between the color filters 127 and the common electrode layer 126. The GP plate 130 may receive the third light L3 and modulate the phase of the third light L3 for each sub-complex pixel. For example, the GP plate 130 may change the phase of the third light L3 that passes through some of the sub-complex pixels by 120°, the phase of the third light L3 that passes through some other sub-complex pixels by 240°, and the phase of the third light L3 that passes through some other sub-complex pixels by 360°. The GP plate 130 may be referred to as the phase modulator. The phase modulation characteristics of the GP plate 130 may be affected less or may not be substantially affected by wavelengths. For example, the GP plate 130 may have substantially the same phase modulation characteristics with respect to the light having different wavelengths. The phase modulation characteristics of the GP plate 130 may be substantially same as those described with reference to FIGS. 2 to 8. The GP plate 130 may change the polarization direction of the third light L3. For example, the GP plate 130 may receive the third light L3 that is left-circular polarized and emit fourth light L4 that is right-circular polarized. In an example, as the GP plate 130 receives part of the third light L3 that is right-circular polarized, part of the fourth light L4 may be left-circular polarized. The part of the fourth light L4 that is left-circular polarized may be noise.

Referring to FIG. 11, the GP plate 130 may include a sub-substrate 130a, an optical alignment layer 130b, a first cured liquid crystal layer 130c, a second cured liquid crystal layer 130d, a third cured liquid crystal layer 130e, and a fourth cured liquid crystal layer 130f. The sub-substrate 130a, the optical alignment layer 130b, the first cured liquid crystal layer 130c, the second cured liquid crystal layer 130d, the third cured liquid crystal layer 130e, and the fourth cured liquid crystal layer 130f may be sequentially arranged in a direction from the first polarization plate 121 to the second polarization plate 132. The sub-substrate 130a may support the optical alignment layer 130b to the fourth cured liquid crystal layer 130f.

The optical alignment layer 130b may be configured such that the first to fourth cured liquid crystal layers 130c, 130d, 130e, and 130f have required liquid crystal alignments. The optical alignment layer 130b may not be provided when the GP plate 130 includes first to fourth anisotropic material layers instead of the first to fourth cured liquid crystal layers 130c, 130d, 130e, and 130f. The first to fourth anisotropic material layers may be sequentially arranged in a direction from the first polarization plate 121 to the second polarization plate 132, similar to the first to fourth cured liquid crystal layers 130c, 130d, 130e, and 130f.

The first to fourth cured liquid crystal layers 130c, 130d, 130e, and 130f may each include cured liquid crystal. The cured liquid crystal of each of the first to fourth cured liquid crystal layers 130c, 130d, 130e, and 130f may have a required twist angle. The twist angle may be an alignment angle difference of liquid crystals arranged in a thickness direction of the first to fourth cured liquid crystal layers 130c, 130d, 130e, and 130f. The first to fourth cured liquid crystal layers 130c, 130d, 130e, and 130f may modulate the phase of the third light L3 passing therethrough. The phase modulation characteristics of the first to fourth cured liquid crystal layers 130c, 130d, 130e, and 130f may be determined by the twist angle of liquid crystals and the thickness of the first to fourth cured liquid crystal layers 130c, 130d, 130e, and 130f. The twist angle of liquid crystals of first cured liquid crystal layer 130c and the twist angle of liquid crystals of the fourth cured liquid crystal layer 130f may have substantially the same magnitude, but may have opposite directions. The thickness of the first cured liquid crystal layer 130c and the thickness of the fourth cured liquid crystal layer 130f may be substantially identical to each other. The twist angle of liquid crystals of the second cured liquid crystal layer 130d and the twist angle of liquid crystals of the third cured liquid crystal layer 130e may have substantially the same magnitude, but may have opposite directions. The thickness of the second cured liquid crystal layer 130d and the thickness of the third cured liquid crystal layer 130e may be substantially identical to each other.

Referring back to FIGS. 9 and 10, the second substrate 131 may support the GP plate 130, the color filters 127, the black matrix 129, the insulating layer 128, and the common electrode layer 126. The second substrate 131 may be a transparent substrate. For example, the second substrate 131 may be a glass substrate. In an example, in a process of forming the complex light modulation element 120A, after the TFT layer 123 and the sub-pixel electrodes 124 are formed on the first substrate 122, the GP plate 130, and the color filters 127, the black matrix 129, the insulating layer 128, and the common electrode layer 126 are formed on the second substrate 131, the first substrate 122 and the second substrate 131 are arranged to allow the sub-pixel electrodes 124 and the common electrode layer 126 to be spaced apart from each other, and a process of injecting liquid crystals between the sub-pixel electrodes 124 and the common electrode layer 126 may be performed.

The second polarization plate 132 may optionally pass light having a required polarization therethrough. For example, the second polarization plate 132 may pass light that is right-circular polarized, and block light that is left-circular polarized. Accordingly, the second polarization plate 132 may receive the fourth light L4 to block part of the fourth light L4 that is left-circular polarized, which is noise, and pass therethrough only the fourth light L4 that is right-circular polarized. The fourth light L4 that passed through the second polarization plate 132 may be referred to as the fifth light L5.

Accordingly, the complex light modulation element 120A including the covalent bond-type complex pixel group G2, which is described above with reference to FIGS. 2 to 8, may be provided.

When a complex light modulation element is formed by a method in which a phase modulator and an amplitude modulator are separately manufactured and combined with each other, sub-pixels of the phase modulator and sub-pixels of the amplitude modulator, which constitute a sub-complex pixel, may be difficult to be easily aligned. Furthermore, as the second substrate 131 for supporting the color filters 127 is arranged between the amplitude modulator and the phase modulator, a distance between the phase modulator and the amplitude modulator may be increased to a degree of being affected by the diffraction by the amplitude modulator. For example, even when the sub-pixels of the amplitude modulator and the sub-pixels of the phase modulator are aligned, 1st order or higher diffraction light may not pass through the sub-pixels of the amplitude modulator and the sub-pixels of the phase modulator corresponding to each other. For example, as light that passed through one sub-pixel of the amplitude modulator is diffracted, the light may pass through a sub-pixel adjacent to one sub-pixel of the phase modulator corresponding to the one sub-pixel of the amplitude modulator. In this case, it may be difficult for the complex light modulation element to have the required complex light modulation characteristics.

As the phase modulator according to the example embodiment is arranged immediately adjacent to the color filters 127, the alignment between the sub-pixels of the amplitude modulator and the sub-pixels of the phase modulator may be facilitated. Furthermore, as the amplitude modulator and the phase modulator are arranged between the first substrate 122 and the second substrate 131, the distance between the amplitude modulator and the phase modulator may be decreased. The complex light modulation element 120A may be less affected by the diffraction of light by the amplitude modulator. Accordingly, the complex light modulation element 120A may have the required and improved complex light modulation characteristics.

Figure 13:
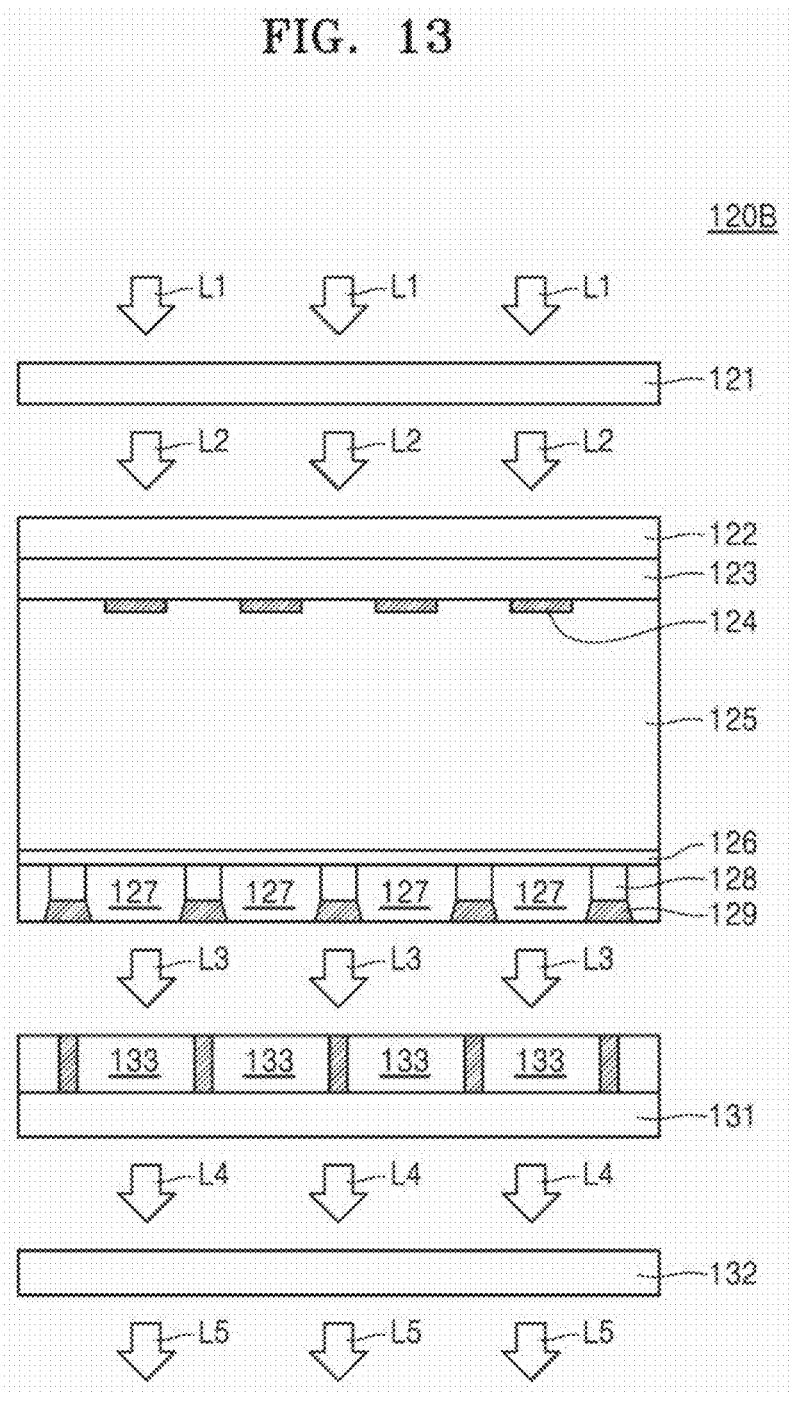

FIGS. 12 and 13 are cross-sectional views of the complex light modulation element 120 of FIG. 1 according to an example embodiment. For brevity of explanation, descriptions that are substantially the same as those given with reference to FIGS. 9 and 10 are omitted.

Referring to FIGS. 12 and 13, a complex light modulation element 120B may be provided. The complex light modulation element 120B may include phase modulation patterns 133, as a phase modulator, instead of the GP plate 130.

The phase modulation patterns 133 may each have a thickness corresponding to the phase modulation characteristics. The phase modulation patterns 133 having the same phase modulation characteristics may have the same thickness, and the phase modulation patterns 133 having different phase modulation characteristics may have different thicknesses. However, for brevity of explanation, the phase modulation patterns 133 are illustrated as having the same thickness. For example, the phase modulation patterns 133 may include silicon oxide ($SiO_2$).

The phase modulation patterns 133 may receive the third light L3 and modulate the phase of the third light L3 for each sub-complex pixel. The phase modulation characteristics of the phase modulation patterns 133 may be substantially same as those described with reference to FIGS. 2 to 8. The phase modulation patterns 133 may change the polarization direction of third light L3. For example, the phase modulation patterns 133 may emit fourth light L4 that is right-circular polarized. In an example, part of the fourth light L4 may be left-circular polarized. The part of the fourth light L4 that is left-circular polarized may be noise.

According to the example embodiment, the alignment between the sub-pixels of the amplitude modulator and the sub-pixels of the phase modulator may be easier, and the complex light modulation element 120B may be less affected by the diffraction of the light by the amplitude modulator. Accordingly, the complex light modulation element 120B may have the required and improved complex light modulation characteristics.

Figure 14:
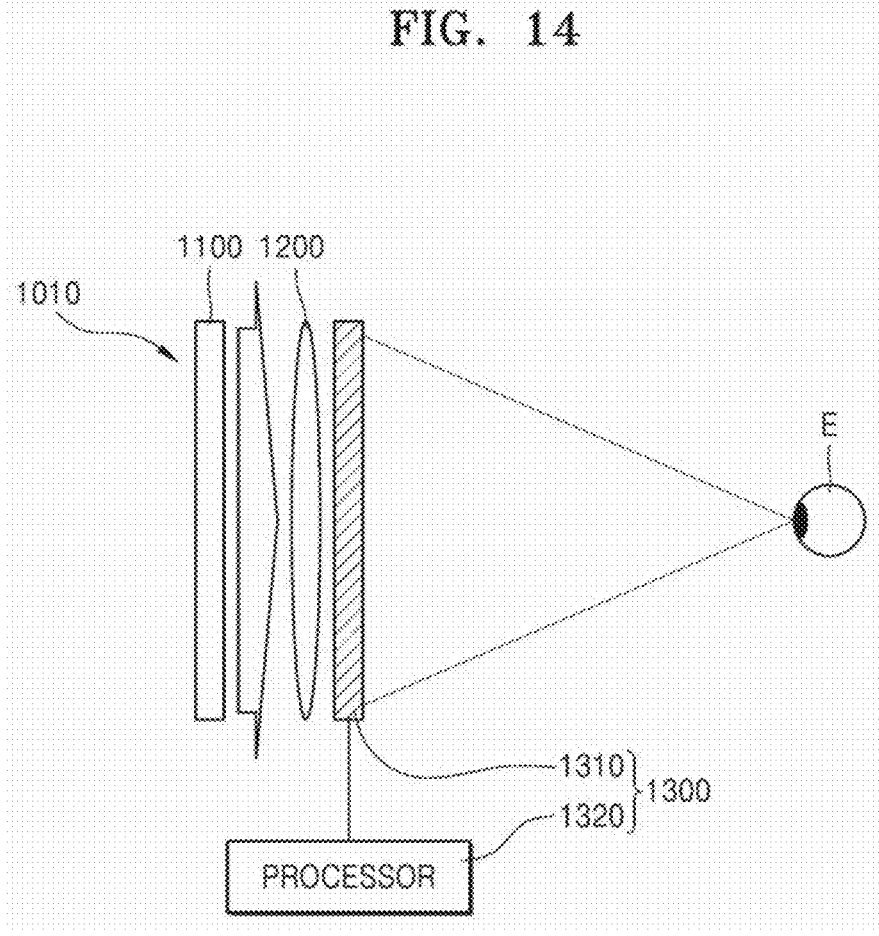
FIG. 14 is a conceptual view of a holographic display device according to an example embodiment.

FIG. 14 is a conceptual view of a holographic display device 1010 according to an example embodiment. For brevity of explanation, descriptions that are substantially the same as those given with reference to FIGS. 1 to 8 are omitted.

Referring to FIG. 14, the holographic display device 1010 may be provided. The holographic display device 1010 may include a backlight unit 1100, a Fourier lens 1200, and a complex light modulator 1300. The complex light modulator 1300 may include a complex light modulation element 1310 and a processor 1320. The complex light modulator 1300 may be substantially same as the complex light modulator 100 described with reference to FIGS. 1 to 8.

The backlight unit 1100 may emit coherent light. For example, the backlight unit 1100 may include a laser diode to provide light having high coherence. However, embodiments are not limited thereto, and the backlight unit 1100 may include any light source configured to emit light having spatial coherence. Furthermore, the backlight unit 1100 may further include an optical system configured to generate collimated parallel light having a uniform intensity distribution by magnifying light emitted from the laser diode. Accordingly, the backlight unit 1100 may provide parallel coherent light having a spatially uniform intensity distribution to the entire area of the complex light modulation element 1310.

The Fourier lens 1200 may focus a holographic image or an image in space. For example, a holographic image is regenerated on a focal plane of the Fourier lens 1200, and an eye E of a user may be arranged on the focal plane, so that the holographic image may be viewed. Although the Fourier lens 1200 is illustrated as being disposed on a light incident surface of the complex light modulation element 1310, for example, between the backlight unit 1100 and the complex light modulation element 1310, the position of the Fourier lens 1200 is not limited thereto. For example, the Fourier lens 1200 may be disposed on a light exit surface of the complex light modulation element 1310.

The resolution of the holographic display device 1010 may be determined based on the resolution of the complex light modulation element 1310. As the complex light modulation element 1310 has a high resolution, the resolution characteristics of the holographic display device 1010 according to the example embodiment may be improved. In addition, the holographic display device 1010 according to the example may have a relatively large viewing window. Hereinafter, the viewing window of the holographic display device 1010 according to the example embodiment is described.

Figures 15, 16:
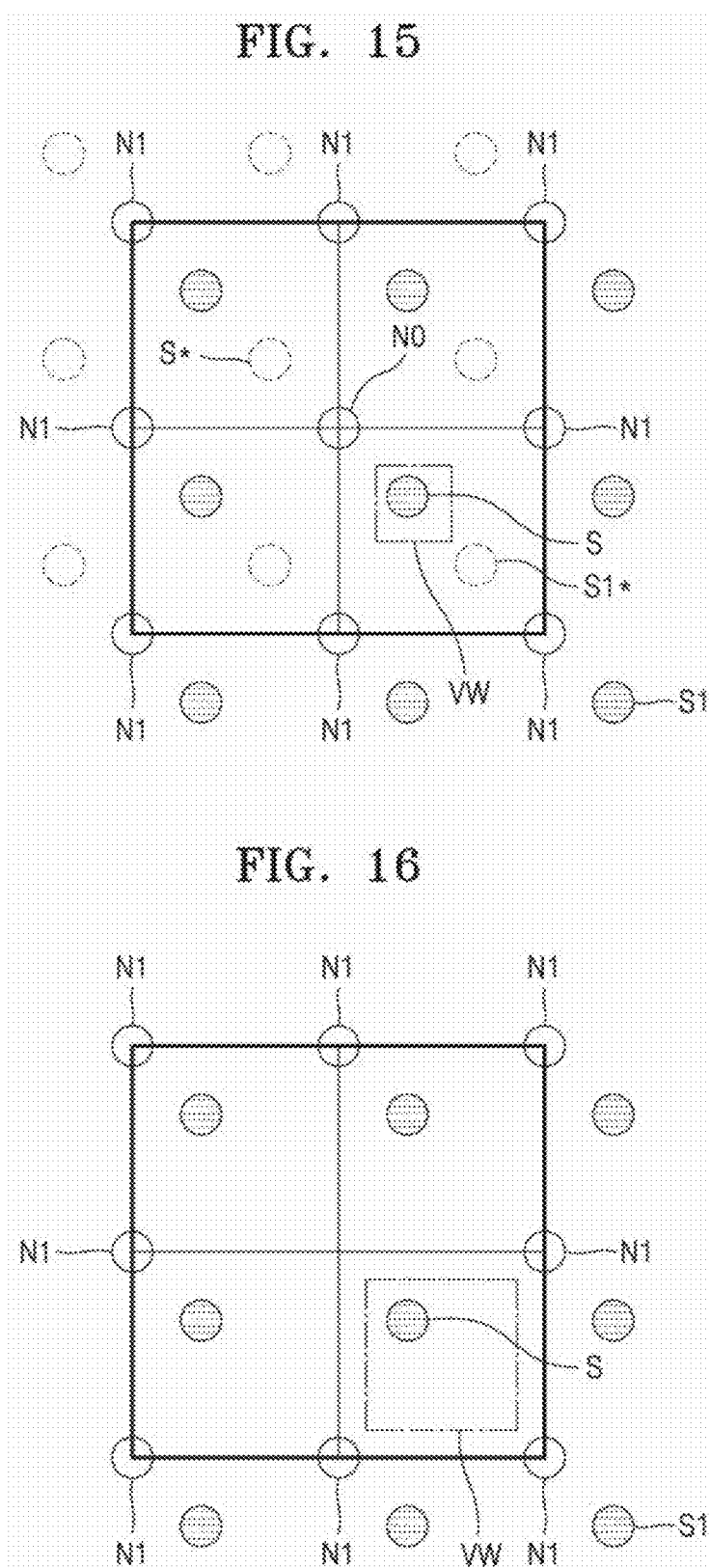
FIG. 15 illustrates a distribution of light formed on a focal plane of a Fourier lens of FIG. 14 when the phases and amplitudes of sub-complex pixels do not have point symmetry.
FIG. 16 illustrates a distribution of light formed on a focal plane of a Fourier lens by a holographic display device according to an example embodiment.

FIG. 15 illustrates a distribution of the light formed on the focal plane of the Fourier lens 1200 of FIG. 14, without employing the complex modulation of the example embodiment, when only a spatial amplitude light modulator is used without phase modulation (conventional amplitude hologram), or when the phases and amplitudes of sub-complex pixels are not point symmetric.

Referring to FIG. 15, 0-th order noise NO may be formed at the center of the focal plane of the Fourier lens 1200, that is, on the optical axis of the Fourier lens 1200. The 0-th order noise NO may be generated as part of light incident on an amplitude modulator including the spatial light modulator transmits the amplitude modulator, without being diffracted.

The higher-order noises N1 generated in the vicinity of the 0-th order noise NO due to higher-order diffraction are regularly formed in a lattice form. The higher-order noises N1 may be generated by the interference of light diffracted due to a regular pixel structure of the amplitude modulator and/or wiring structure, not by the hologram pattern.

The 0-th order and higher-order noises NO and N1 are generated due to the physical internal structure of the amplitude modulator and a coherent laser light source, and are not relevant to the hologram pattern represented by the amplitude modulator, and thus, the positions of the 0-th order and higher-order noises NO and N1 may be fixed on the focal plane of the Fourier lens 1200.

The position of a holographic image S may be determined by the hologram pattern defined by the phase modulator and the amplitude modulator. The hologram pattern may be formed to regenerate the holographic image S at a position where the 0-th order and higher-order noises NO and N1 are not present. For example, the phase modulator may generate a prism pattern with the hologram pattern. The prism pattern may be generated based on a prism phase that is added by the processor 1320 to CGH data including the holographic image S information. The holographic image S may be regenerated off the optical axis (off-axis type regeneration). Accordingly, the regenerated holographic image S may be spaced apart from the 0-th order and higher-order noises NO and N1. The off-axis type regeneration that is a method to avoid the 0-th order and higher-order noises NO and N1 may be adopted as necessary.

The holographic image S may be spaced apart from the 0-th order noise NO in a diagonal direction by using the off-axis method. For the off-axis method, a complex conjugate image S* may be generated together at a side opposite to the holographic image S with respect to the 0-th order noise NO. The complex conjugate image may be referred to as the conjugate noise. Holographic images S1 and the complex conjugate images S1* thereof may be generated together due to the higher-order diffraction in a diagonal direction with respect to the higher-order noises N1.

A viewing window VW is a region where the holographic image S is located. The size of the viewing window VW may be limited by the 0-th order and higher-order noises NO and N1, the complex conjugate image S*, and the holographic images S1 and the complex conjugate images S1* by the higher-order diffraction.

FIG. 16 illustrates a distribution of light formed on the focal plane of the Fourier lens 1200 by the holographic display device 1010 according to the example embodiment.

In the complex hologram of the example embodiment, as the 0-th order DC is offset by the three phase (0°, 120°, and 240° modulations that are structurally point symmetric in the 0-th order, the 0-th order noise (NO of FIG. 15) and the conjugate noise (S* of FIG. 15) may not be generated. As the conjugate noise (S* of FIG. 15) is not generated, the conjugate noise (S1* of FIG. 15) by the higher-order diffraction may not be generated.

As factors that limit the size of the viewing window VW are reduced, the viewing window VW may expand. Accordingly, the example embodiment may provide the holographic display device 1010 having a relatively large viewing window.

Figure 17:
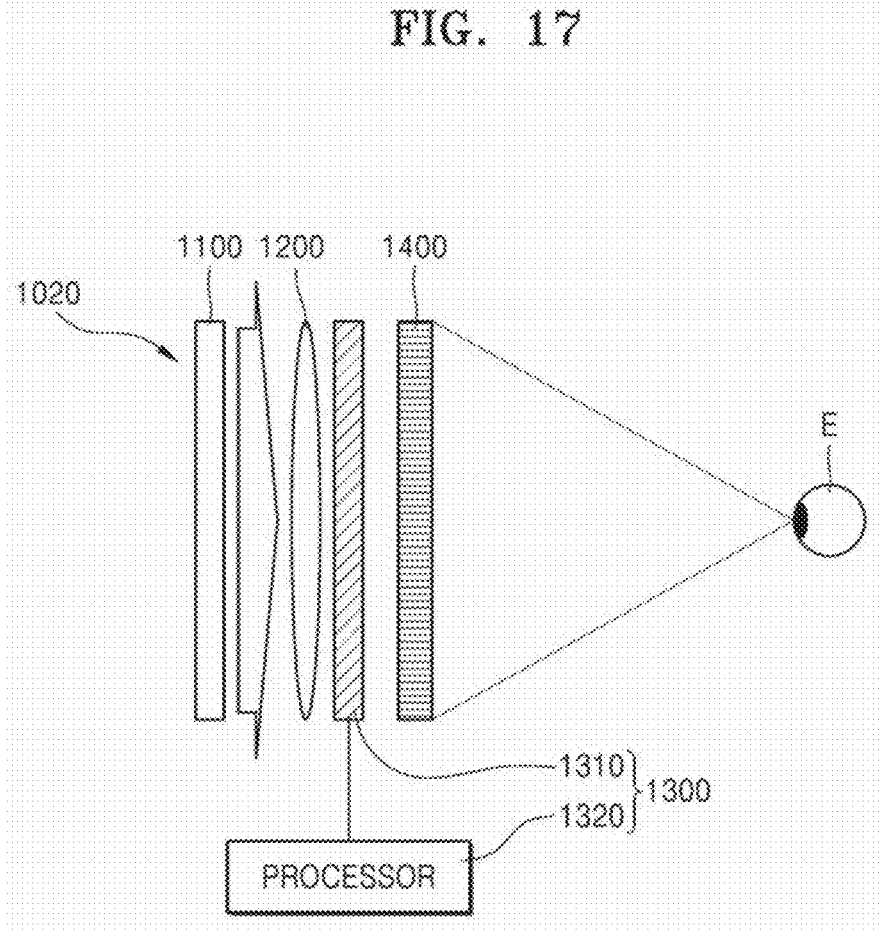
FIG. 17 is a conceptual view illustrating a holographic display device according to an example embodiment.
Figure 18:
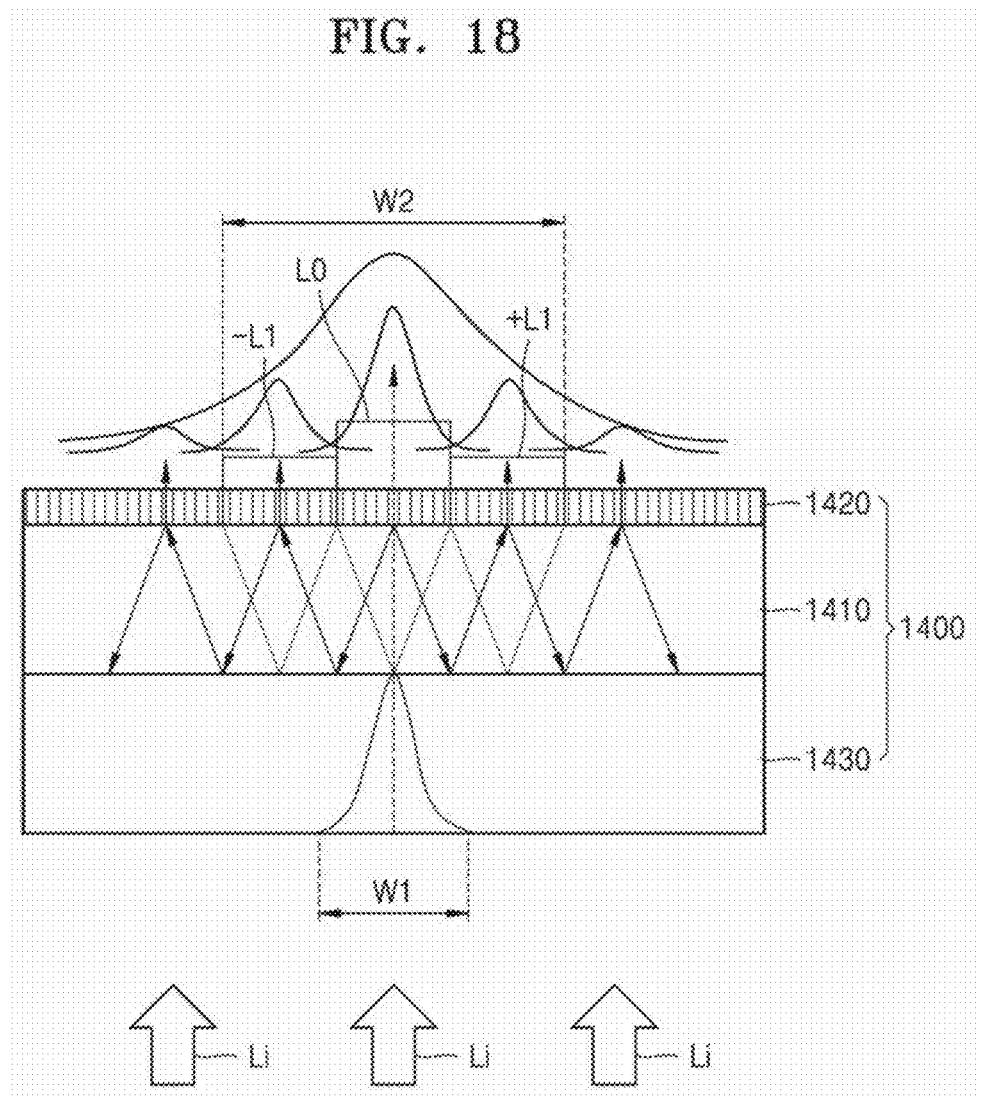
FIG. 18 is a conceptual view illustrating an anti-diffraction film of FIG. 17.

FIG. 17 is a conceptual view illustrating a holographic display device 1020 according to an example embodiment. FIG. 18 is a conceptual view illustrating an anti-diffraction film 1400 of FIG. 17. For brevity of explanation, descriptions that are substantially the same as those given with reference to FIG. 14 are omitted.

Referring to FIG. 18, the holographic display device 1020, unlike the holographic display device 1010 of FIG. 14, may further include the anti-diffraction film 1400. The anti-diffraction film 1400 may be disposed to face the light exit surface of the complex light modulation element 1310. A plurality of light beams may be provided to the anti-diffraction film 1400. The light beams may be emitted from each of the sub-complex pixels of the complex light modulation element 1310 described with reference to FIGS. 1 to 8.

Referring to FIG. 18, the anti-diffraction film 1400 may include a light guide layer 1410 and a grid layer 1420. The light guide layer 1410 may be provided between the grid layer 1420 and the complex light modulation element 1310. The light guide layer 1410 may be disposed parallel to the light exit surface of the complex light modulation element 1310. The grid layer 1420 may be disposed on an upper surface of the light guide layer 1410 disposed at the opposite side to the complex light modulation element 1310. The anti-diffraction film 1400 may further include a substrate 1430 for supporting the light guide layer 1410 and the grid layer 1420 not to be bent. The substrate 1430 may be disposed on a lower surface of the light guide layer 1410. However, when the light guide layer 1410 is supported without bending, the substrate 1430 may be omitted. In an example, the light guide layer 1410 may be much thinner than the substrate 1430. For example, while the thickness of the substrate 1430 may be about 0.5 mm to about 1 mm, the thickness of the light guide layer 1410 may be about 1 μm to about 5 μm. The substrate 1430 may include hard glass or a transparent polymer material, and the light guide layer 1410 may include a transparent material having a higher refractive index than the substrate 1430 to transmit light therein.

The grid layer 1420 may emit part of light incident thereon from the light guide layer 1410 in a direction perpendicular to an upper surface of the grid layer 1420, and may reflect light other than the light incident in a perpendicular direction to obliquely proceed toward the light guide layer 1410. The grid layer 1420 may be formed in various types of surface gratings or volume gratings. The surface grating may include, for example, a diffractive optical element (DOE) such as a binary phase grating, a blazed grating, and the like. Furthermore, the volume grating may include, for example, a holographic optical element (HOE), a GP grating, a Bragg polarization grating, a holographically formed polymer dispersed liquid crystal (H-PDLC), and the like. Such a volume grating may include periodic fine patterns of materials having different refractive indexes. According to the size, height, cycle, duty ratio, shape, and the like of periodic grating patterns constituting the grid layer 1420, the grid layer 1420 diffracts incident light to cause destructive interference and constructive interference, thereby changing the traveling direction of incident light.

The grid layer 1420 may transmit the 0-th order diffracted light beam among the light beams vertically or obliquely incident on the lower surface thereof in a direction parallel to a normal of the upper surface of the grid layer 1420, and reflect the 1st order diffracted light beam to travel obliquely toward the light guide layer 1410. The light guide layer 1410 may be configured to propagate, through total reflection, the light beam obliquely coming from the grid layer 1420 along the inside of the light guide layer 1410. Accordingly, the 1st order diffracted light beam may travel along the inside of the light guide layer 1410 while being totally reflected between the lower surface and the upper surface of the light guide layer 1410. For example, as indicated by an arrow, the +1st order diffracted light beam may travel in the right direction of the light guide layer 1410, and the −1st order diffracted light beam may travel in the left direction of the light guide layer 1410. Although the −1st order diffracted light beam traveling to the left and the +1st order diffracted light beam traveling to the right are representatively illustrated, the 1st order diffracted light beam may travel in all radial directions with respect to the incident position of the grid layer 1420.

The 1st order diffracted light beam may be totally reflected by the grid layer 1420 from the lower surface of the light guide layer 1410 and then obliquely incident on the upper surface of the light guide layer 1410. Although a portion of the 1st order diffracted light beam is totally reflected again from the upper surface of the light guide layer 1410, the remaining portion of the 1st order diffracted light beam is diffracted by the grid layer 1420 and exits in the direction parallel to the normal of the upper surface of the grid layer 1420. Accordingly, the light beam exiting from the grid layer 1420 may include a light beam L0 output by the 0-th order diffraction and a light beam L1 output by the 1st order diffraction. Although the light beams −L1 and +L1 output by the ±1st order diffractions are representatively illustrated, one by one, at the left and right of the light beam L0 output by the 0-th order diffraction, light beams L1 output by the 1st order diffraction may be continuously arranged along the perimeter of the light beam L0 output by the 0-th order diffraction. From the viewpoint following a direction perpendicular to the upper surface of the grid layer 1420, the light beams L1 output by the 1st order diffraction may have a ring shape surrounding the light beam L0 output by the 0-th order diffraction. To this end, the grid layer 1420 may be configured as a two-dimensional grating film capable of diffracting incident light in all directions. According to another example embodiment, the grid layer 1420 may be configured by stacking two one-dimensional grating films having directions orthogonal to each other. In this case, for example, a light beam may be magnified and output in the horizontal direction by the one-dimensional grating film in the horizontal direction, and a light beam may be magnified in the vertical direction by the one-dimensional grating film in the vertical direction so that the light beam L1 of a ring shape may be output finally.

The light beam L1 output by the 1st order diffraction may at least partially overlap the light beam L0 output by the 0-th order diffraction. A degree to which the light beam L1 output by the 1st order diffraction overlaps the light beam L0 output by the 0-th order diffraction may vary depending on the thickness of the light guide layer 1410. As the thickness of the light guide layer 1410 increases, an interval between the light beam L1 output by the 1st order diffraction and the light beam L0 output by the 0-th order diffraction may increase. The maximum thickness of the light guide layer 1410 may be selected such that a boundary of the light beam L1 output by the 1st order diffraction matches a boundary of the light beam L0 output by the 0-th order diffraction.

As described above, each of the light beams Li incident on the anti-diffraction film 1400 from the complex light modulation element 1310 may be divided into the light beam L0 output by the 0-th order diffraction and the light beam L1 output by the 1st order diffraction, while passing through the anti-diffraction film 1400. One magnified light beam may be seen by summing light beams. As a result, the anti-diffraction film 1400 may serve to magnify the beam diameter of each of the light beams Li incident on the anti-diffraction film 1400 from the complex light modulator 1300. For example, each of the light beams Li incident on the anti-diffraction film 1400 from the complex light modulation element 1310 may have a first beam diameter W1, and a light beam magnified while passing through the anti-diffraction film 1400 may have a second beam diameter W2 greater than the first beam diameter W1. The first beam diameter W1 may be determined by a physical grating structure of the spatial light modulator included in the complex light modulation element 1310. For a grating structure formed by wirings of the spatial light modulator, the first beam diameter W1 may be substantially same as a distance between the wirings. For a grating structure formed by black masks that separate pixels of the spatial light modulator, the first beam diameter W1 may be substantially same as the size of an opening defined between black masks.

The second beam diameter W2 of the light beam magnified by the anti-diffraction film 1400 may vary depending on a degree to which the light beam L0 output by the 0-th order diffraction overlaps the light beam L1 output by the 1st order diffraction. For example, the second beam diameter W2 of the light beam magnified by the anti-diffraction film 1400 may be determined by the thickness of the light guide layer 1410. For example, the thickness of the light guide layer 1410 may be selected such that the second beam diameter W2 of the light beam magnified by the anti-diffraction film 1400 is greater than the pixel size of the spatial light modulator included in the complex light modulation element 1310.

The spatial light modulator may include regions through which light is not transmitted. For example, the regions through which light is not transmitted may include regions in which the wirings for driving pixels and the black masks for separating pixels are provided. Accordingly, a gap having no image information may be present between the light beams emitted from the spatial light modulator. The gap between the light beams may increase the intensity of a higher-order diffraction pattern. As the anti-diffraction film 1400 of the embodiment increases the beam diameters of light beams, the intensity of the higher-order diffraction pattern may decrease and finally the higher-order diffraction pattern may be removed.

The intensity of the light beam L0 output by the 0-th order diffraction is greater than the intensity of the light beam L1 output by the 1st order diffraction. Accordingly, the light beam magnified by the anti-diffraction film 1400 may have a shape approximately similar to the Gaussian distribution in which intensity decreased from the center of a light beam toward a peripheral portion. Due to the magnified light beam having a beam diameter greater than the first beam diameter W1 and a distribution in which intensity decreases from the center to the peripheral portion, the higher-order noise (N1 of FIG. 15) generated on the focal plane of the Fourier lens 1200 and the holographic images (S1 of FIG. 15) generated by the higher-order noise (N1 of FIG. 15) may be reduced or may not be generated. For example, the factors that limit the size of a viewing window may be reduced. Accordingly, a viewing window may be magnified.

Figures 19, 20:
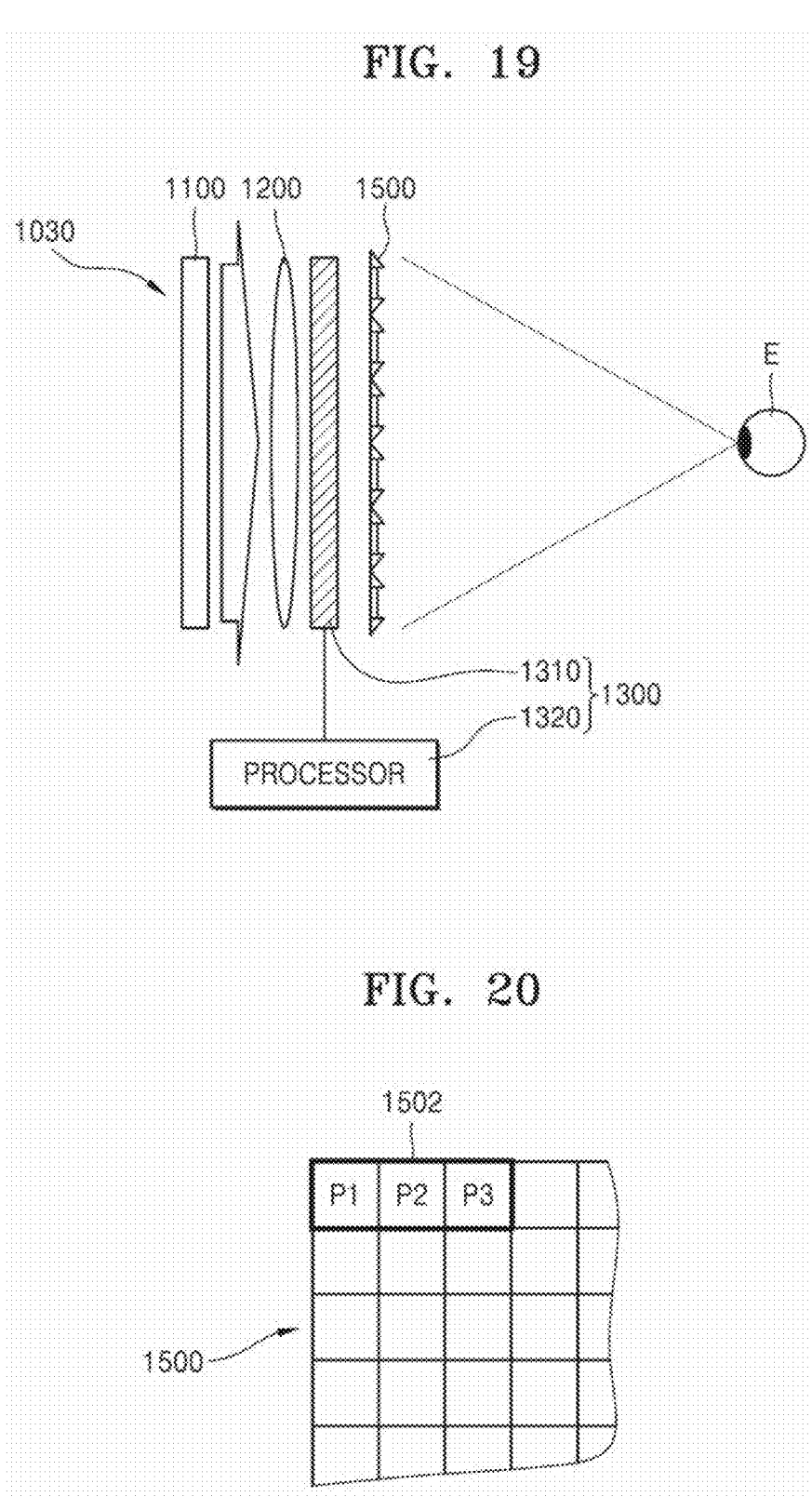
FIG. 19 is a conceptual view of a holographic display device according to an example embodiment.
FIG. 20 illustrates a prism array of FIG. 19.
Figures 21, 22:
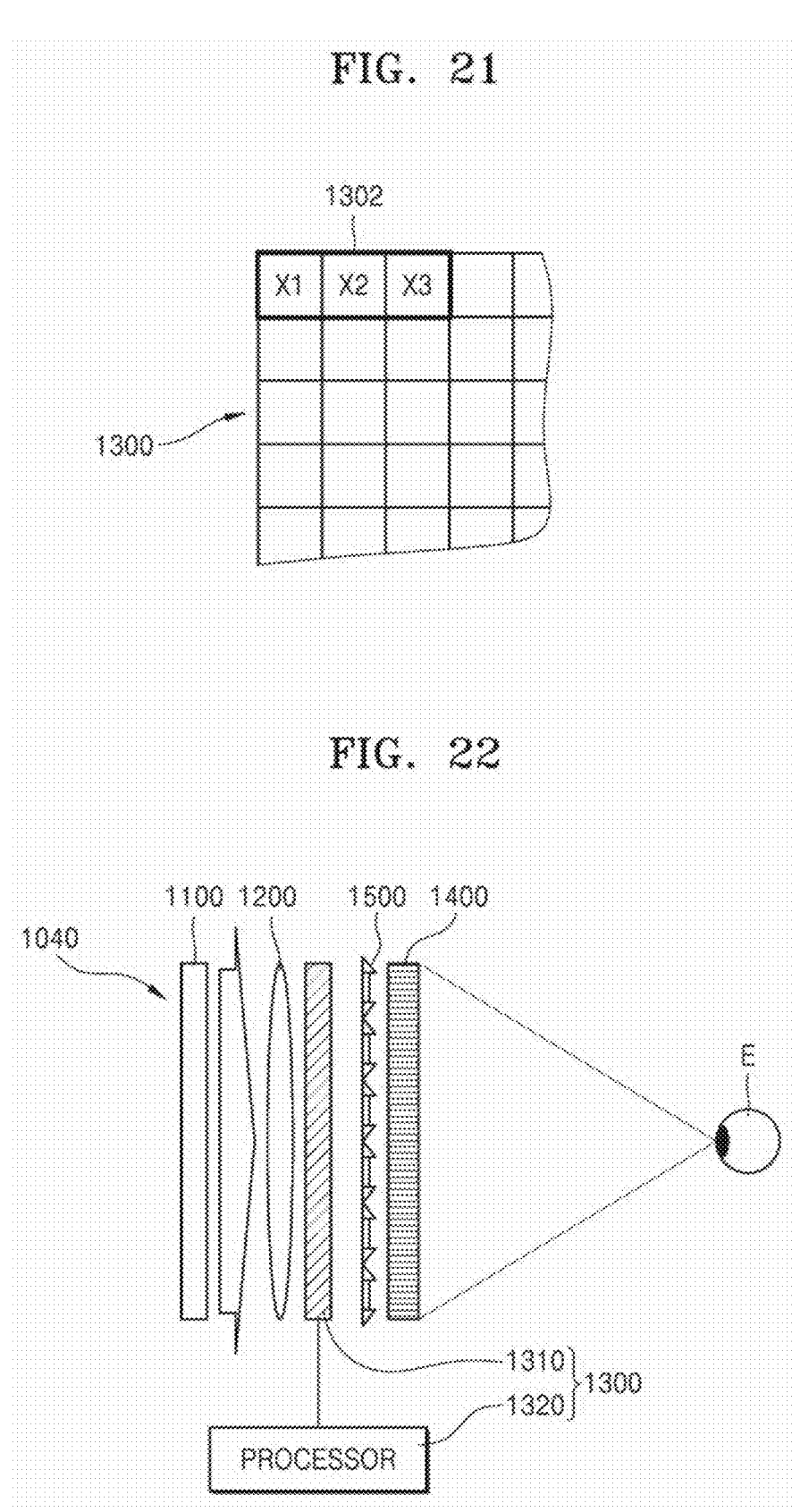
FIG. 21 illustrates complex pixels of a complex light modulator of FIG. 19.
FIG. 22 is a conceptual view of a holographic display device according to an example embodiment.

FIG. 19 is a conceptual view of a holographic display device 1030 according to an embodiment. FIG. 20 illustrates a prism array 1500 of FIG. 19. FIG. 21 illustrates complex pixels of the complex light modulator 1300 of FIG. 19. For brevity of explanation, descriptions that are substantially the same as those given with reference to FIG. 14 are omitted.

Referring to FIG. 19, the holographic display device 1030 may be provided. The holographic display device 1030 may further include the prism array 1500. The prism array 1500 may be disposed on the light exit surface of the complex light modulation element 1310. The prism array 1500 may include a plurality of prisms for allowing light to travel in different directions.

Referring to FIG. 20, the prism array 1500 may be divided into a plurality of unit regions 1502 arranged in two dimensions. Each of the unit regions 1502 may include a plurality of prisms P1, P2, and P3 configured to allow light to travel in different directions. Accordingly, the prism array 1500 may include the prisms P1, P2, and P3 that are repeatedly arranged. For example, among the prisms P1, P2, and P3, the first prism P1 may be configured to change the traveling direction of light to a first direction, the second prism P2 may be configured to change the traveling direction of light to a second direction different from the first direction, and the third prism P3 may be configured to change the traveling direction of light to a third direction different from the first and second directions.

Although each of the unit regions 1502 is illustrated as including the prisms P1, P2, and P3 arranged in a 1×3 matrix, the disclosure is not limited thereto. The prism arrangement in each of the unit regions 1502 may be selected differently according to the number of holographic images of different points of view that the holographic display device 1030 simultaneously provides. For example, when the holographic display device 1030 provides holographic images of four different points of view in the horizontal direction, each of the unit regions 1502 may include prims in a 1×4 matrix. Furthermore, when the holographic display device 1030 provides holographic images of four different points of view in the horizontal and vertical directions, each of the unit regions 1502 may include prisms in a 2×2 matrix.

Referring to FIG. 21, the complex light modulation element 1310 may include a plurality of unit regions 1302 arranged in two dimensions. The arrangement format of each of the unit regions 1302 of the complex light modulation element 1310 may have the same arrangement format of the unit regions 1502 of the prism array 1500. For example, when each of the unit regions 1502 of the prism array 1500 includes the prisms P1, P2, and P3 in a 1×3 matrix, each of the unit regions 1302 of the complex light modulation element 1310 may include complex pixels X1, X2, and X3 arranged in a in a 1×3 matrix. The prisms P1, P2, and P3 of the prism array 1500 may one-to-one correspond to the complex pixels of the complex light modulation element 1310.

In an example, the complex pixels X1, X2, and X3 may operate to regenerate a holographic image having different points of view. For example, among the complex pixels X1, X2, and X3, the first complex pixel X1 may operate to regenerate a holographic image of a first viewpoint, the second complex pixel X2 may operate to regenerate a holographic image of a second viewpoint different from the first viewpoint, and the third complex pixel X3 may operate to regenerate a holographic image of a third viewpoint different from the first and second viewpoints.

The processor 1320 may be configured to provide the first complex pixel X1 with a first hologram data signal for the holographic image of the first viewpoint, the second complex pixel X2 with a second hologram data signal for the holographic image of the second viewpoint, and the third complex pixel X3 with a third hologram data signal for the holographic image of the third viewpoint.

Although each of the unit regions 1302 is illustrated, for example, as including the complex pixels in a 1×3 matrix, embodiments are not limited thereto. The arrangement of the complex pixels in each of the unit regions 1302 may be selected differently depending on the number of holographic images of different points of view to be simultaneously provided by the holographic display device 1030. For example, when the holographic display device 1030 provides holographic images of four different points of view in the horizontal direction, each of the unit regions 1302 may include complex pixels in a 1×4 matrix. Furthermore, when the holographic display device 1030 provides holographic images of four different points of view in the horizontal and vertical directions, each of the unit regions 1302 may include complex pixels in a 2×2 matrix.

According to an example embodiment, the holographic display device 1030 may simultaneously regenerate holographic images of multiple points of view.

FIG. 22 is a conceptual view of a holographic display device 1040 according to an example embodiment. For brevity of explanation, descriptions that are substantially the same as those given with reference to FIGS. 17 and 18 and FIGS. 19 to 21 are omitted.

Referring to FIG. 22, the holographic display device 1040 may be provided. The holographic display device 1040 may include the holographic display device 1030 described with reference to FIGS. 19 to 21 and the anti-diffraction film 1400 described with reference to FIGS. 17 and 18.

In the holographic display device 1040, the anti-diffraction film 1400 may be disposed on the exit surface of the prism array 1500.

The example embodiment may provide the holographic display device 1040 that prevents generation of noises and simultaneously regenerates holographic images of multiple points of view.

Figures 23, 24:
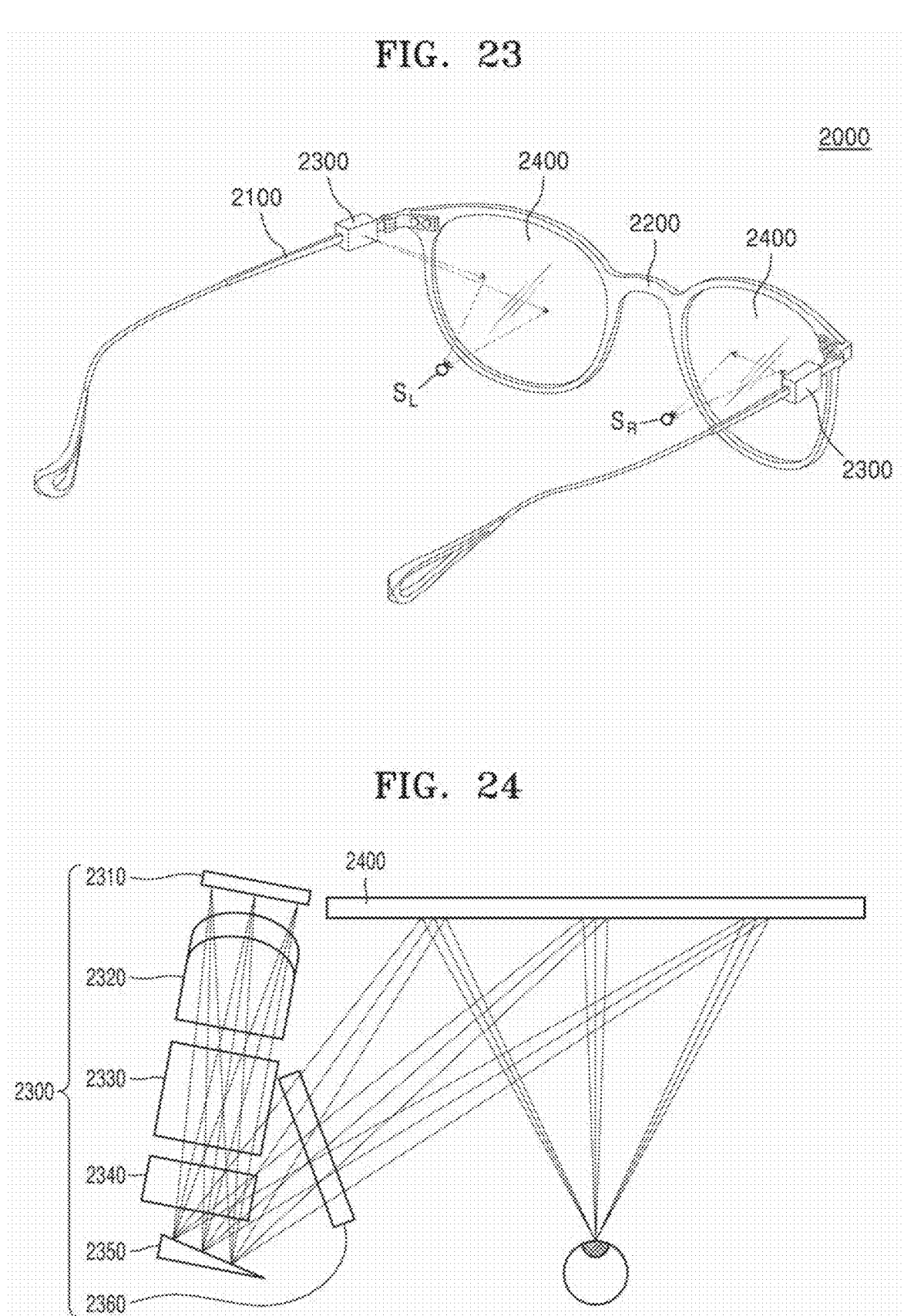
FIG. 23 is a conceptual view of a see-through display device according to an example embodiment.
FIG. 24 is a conceptual view of an electronic unit and a combiner of FIG. 23.

FIG. 23 is a conceptual view of a see-through display device 2000 according to an example embodiment. FIG. 24 is a conceptual view of the electronic unit and the combiner of FIG. 23.

Referring to FIG. 23, the see-through display device 2000 may be provided. For example, the see-through display device 2000 may be a glasses type augmented reality device. The see-through display device 2000 may include a pair of temples 2100, a lens frame 2200, an electronic unit 2300, and a pair of combiners 2400. The pair of temples 2100 may be connected to both end portions of the lens frame 2200. The pair of temples 2100 may be hung over the user's ears.

The lens frame 2200 may include a pair of holes. The pair of combiners 2400 may be respectively inserted in the pair of holes. When the user wears the see-through display device 2000, the user's both eyes may face the pair of combiners 2400, respectively.

Referring to FIG. 24, the electronic unit 2300 may include a holographic display device 2310, an aspherical lens 2320, a polarization beam splitter 2330, a first free-form lens 2340, a projection optical system 2350, and a second free-form lens 2360. In an example, the electronic unit 2300 may further include an eye tracker capable of tracking the position of user's pupil.

The holographic display device 2310 may generate and emit holographic image light including holographic image information. The holographic display device 2310 may be any one of the holographic display devices 1010, 1020, 1030, and 1040 described above.

The aspherical lens 2320, the polarization beam splitter 2330, and the first free-form lens 2340 may be disposed between the holographic display device 2310 and the projection optical system 2350 and may transmit the holographic image light to the projection optical system 2350.

The optical system between holographic display device 2310 and the projection optical system 2350 may be configured as necessary. For example, at least one of the aspherical lens 2320, the polarization beam splitter 2330, or the first free-form lens 2340 may be omitted, or other optical elements may be additionally provided.

The projection optical system 2350 may provide the holographic image light to each of the pair of combiners 2400. The projection optical system 2350 may be driven by a mechanical or non-mechanical method to adjust the position of an image on each of the pair of combiners 2400 that the holographic image light reaches. The second free-form lens 2360 may be disposed on an optical path of the holographic image light between the projection optical system 2350 and each of the pair of combiners 2400.

The optical system between the projection optical system 2350 and each of the pair of combiners 2400 may be configured as necessary. For example, the second free-form lens 2360 may be omitted, or other optical elements may be additionally provided.

The holographic image light may be reflected and focused by each of the pair of combiners 2400. For example, the holographic image light focused by one of the pair of combiners 2400 facing the left eye of a user may be focused in a left region SL, and the holographic image light focused by the other of the pair of combiners 2400 facing the right eye of the user may be focused in a right region SR. For example, the left region SL and the right region SR may be a region where the left pupil is positioned and a region where the right pupil is positioned, respectively. Actual image light may reach the both eyes of a user by passing through the pair of combiners 2400. Accordingly, the user may simultaneously see a holographic image and an actual image.

When the complex light modulation element of the holographic display device 2310 includes an amplitude modulator and a phase modulator that are separately manufactured, for example, when the second substrate 131 of FIG. 9 is disposed between the amplitude modulator and the phase modulator, the distance between the complex light modulation element and the projection optical system 2350 may be relatively large. For example, the distance between the complex light modulation element and the projection optical system 2350 may be about 30 mm or more. Accordingly, the size of a see-through display device may be increased.

The holographic display device 2310 according to the example embodiment may include a complex light modulation element including an amplitude modulator and a phase modulator that are disposed adjacent to each other. Accordingly, the distance between the complex light modulation element and the projection optical system 2350 may be relatively small. For example, the distance between the complex light modulation element and the projection optical system 2350 may be greater than 0 and less than and equal to 18 mm. Accordingly, the see-through display device may be miniaturized.

Example embodiments may provide a complex light modulator including an amplitude modulator and a phase modulator with an improved alignment state, a holographic display device and a see-through display device, including the complex light modulator.

Example embodiments may also provide a complex light modulator that is less affected by diffraction, a holographic display device and a see-through display device, including the complex light modulator.

Example embodiments may also provide a complex light modulator having a high resolution and low noise, a holographic display device including the complex light modulator, and a see-through display device including the holographic display device.

However, the effect of embodiments are not limited to the above disclosure.

It should be understood that example embodiments described herein should be considered in a descriptive sense only and not for purposes of limitation. Descriptions of features or aspects within each example embodiment should typically be considered as available for other similar features or aspects in other embodiments.

While example embodiments have been described with reference to the figures, it will be understood by those of ordinary skill in the art that various changes in form and details may be made therein without departing from the spirit and scope as defined by the following claims and their equivalents.

What is claimed is:

1. A complex light modulator comprising:

a first polarization plate;

a second polarization plate;

an amplitude modulator provided between the first polarization plate and the second polarization plate;

a phase modulator provided between the amplitude modulator and the second polarization plate; and color filters provided between the amplitude modulator and the phase modulator, wherein the phase modulator and the amplitude modulator are configured to generate a first complex pixel having first complex light modulation characteristics and a second complex pixel having second complex light modulation characteristics, wherein the first complex pixel comprises first sub-complex pixels arranged in a 3×3 matrix and configured to implement the first complex light modulation characteristics, wherein the second complex pixel comprises second sub-complex pixels arranged in a 3×3 matrix and configured to implement the second complex light modulation characteristics, and wherein the first complex pixel and the second complex pixel share a first overlapping pixel included in the first sub-complex pixels and the second sub-complex pixels.

2. The complex light modulator of claim 1, wherein the phase modulator comprises a first cured liquid crystal layer, a second cured liquid crystal layer, a third cured liquid crystal layer, and a fourth cured liquid crystal layer, which are sequentially arranged in a direction from the first polarization plate toward the second polarization plate.

3. The complex light modulator of claim 2, wherein a first twist angle of the first cured liquid crystal layer and a fourth twist angle of the fourth cured liquid crystal layer have a same magnitude and have opposite directions, and wherein a second twist angle of the second cured liquid crystal layer and a third twist angle of the third cured liquid crystal layer have a same magnitude and have opposite directions.

4. The complex light modulator of claim 3, wherein a first thickness of the first cured liquid crystal layer and a fourth thickness of the fourth cured liquid crystal layer are equal to each other, and wherein a second thickness of the second cured liquid crystal layer and a third thickness of the third cured liquid crystal layer are equal to each other.

5. The complex light modulator of claim 2, further comprising a light alignment layer provided between the color filters and the first cured liquid crystal layer.

6. The complex light modulator of claim 1, wherein the phase modulator and the amplitude modulator are further configured to generate a third complex pixel having third complex light modulation characteristics, wherein the first overlapping pixel comprises first overlapping pixels, wherein the third complex pixel comprises third sub-complex pixels arranged in a 3×3 matrix and configured to implement the third complex light modulation characteristics, wherein the first complex pixel, the second complex pixel, and the third complex pixel share one of the first overlapping pixels, and wherein the one of the first overlapping pixels is included in the third sub-complex pixels.

7. The complex light modulator of claim 6, wherein the phase modulator and the amplitude modulator are further configured to generate a fourth complex pixel having fourth complex light modulation characteristics, wherein the fourth complex pixel comprises fourth sub-complex pixels arranged in a 3×3 matrix and configured to implement the fourth complex light modulation characteristics, wherein the first complex pixel, the second complex pixel, the third complex pixel, and the fourth complex pixel share the one of the first overlapping pixels, and wherein the one of the first overlapping pixels is included in the fourth sub-complex pixels.

8. The complex light modulator of claim 7, wherein the first complex pixel and the fourth complex pixel further share a second overlapping pixel included in the first sub-complex pixels and the fourth sub-complex pixels.

9. The complex light modulator of claim 1, wherein phases of the first sub-complex pixels have a point symmetry, and wherein phases of the second sub-complex pixels have a point symmetry.

10. A holographic display device comprising:

a backlight unit configured to provide light having coherence;

a Fourier lens configured to focus the light; and a complex light modulation element provided on a path of the light, wherein the complex light modulation element comprises:

a first polarization plate;

a second polarization plate;

an amplitude modulator provided between the first polarization plate and the second polarization plate;

a phase modulator provided between the amplitude modulator and the second polarization plate; and color filters provided between the amplitude modulator and the phase modulator, wherein the phase modulator and the amplitude modulator are configured to generate a first complex pixel having first complex light modulation characteristics and a second complex pixel having second complex light modulation characteristics, wherein the first complex pixel comprises first sub-complex pixels arranged in a 3×3 matrix and configured to implement the first complex light modulation characteristics, wherein the second complex pixel comprises second sub-complex pixels arranged in a 3×3 matrix and configured to implement the second complex light modulation characteristics, and wherein the first complex pixel and the second complex pixel share a first overlapping pixel included in the first sub-complex pixels and the second sub-complex pixels.

11. The holographic display device of claim 10, wherein the phase modulator contacts the color filters.

12. The holographic display device of claim 10, wherein the phase modulator comprises a first cured liquid crystal layer, a second cured liquid crystal layer, a third cured liquid crystal layer, and a fourth cured liquid crystal layer, which are sequentially arranged in a direction from the first polarization plate toward the second polarization plate, wherein a first twist angle of the first cured liquid crystal layer and a fourth twist angle of the fourth cured liquid crystal layer have a same magnitude and have opposite directions, and wherein a second twist angle of the second cured liquid crystal layer and a third twist angle of the third cured liquid crystal layer have a same magnitude and have opposite directions.

13. A see-through display device comprising:

a holographic display device configured to generate a holographic image;

a combiner configured to combine the holographic image with an actual image and provide a combined image; and a projection optical system configured to project the holographic image provided by the holographic display device to the combiner, wherein the holographic display device comprises:

a backlight unit configured to provide light having coherence;

a Fourier lens configured to focus the light; and a complex light modulation element provided on a path of the light, and wherein the complex light modulation element comprises:

a first polarization plate;

a second polarization plate;

an amplitude modulator provided between the first polarization plate and the second polarization plate;

a phase modulator provided between the amplitude modulator and the second polarization plate; and color filters provided between the amplitude modulator and the phase modulator, wherein the phase modulator and the amplitude modulator are configured to generate a first complex pixel having first complex light modulation characteristics and a second complex pixel having second complex light modulation characteristics, wherein the first complex pixel comprises first sub-complex pixels arranged in a 3×3 matrix and configured to implement the first complex light modulation characteristics, wherein the second complex pixel comprises second sub-complex pixels arranged in a 3×3 matrix and configured to implement the second complex light modulation characteristics, and wherein the first complex pixel and the second complex pixel share a first overlapping pixel included in the first sub-complex pixels and the second sub-complex pixels.

14. The see-through display device of claim 13, wherein a distance between the complex light modulation element and the projection optical system is greater than 0 and less than or equal to 18 mm.

\* \* \* \* \*